(12) United States Patent
Harvey et al.

(10) Patent No.: US 12,069,831 B2
(45) Date of Patent: Aug. 20, 2024

(54) BUILDING AUTOMATION PROGRAMMING USING UI REPRESENTATIONS OF PHYSICAL MODELS

(71) Applicant: PassiveLogic, Inc., Salt Lake City, UT (US)

(72) Inventors: Troy Aaron Harvey, Brighton, UT (US); Jeremy David Fillingim, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 0 days.

(21) Appl. No.: 17/224,976

(22) Filed: Apr. 7, 2021

(65) Prior Publication Data
US 2022/0067230 A1 Mar. 3, 2022

Related U.S. Application Data

(60) Provisional application No. 63/070,460, filed on Aug. 26, 2020.

(51) Int. Cl.
*H05K 7/14* (2006.01)
*F24F 11/32* (2018.01)
(Continued)

(52) U.S. Cl.
CPC ............ *H05K 7/1465* (2013.01); *F24F 11/32* (2018.01); *F24F 11/49* (2018.01); *F24F 11/63* (2018.01);
(Continued)

(58) Field of Classification Search
CPC ............... G06F 3/04186; G06F 3/0482; G06F 3/04847; G06F 3/147; G06F 8/436;
(Continued)

(56) References Cited

U.S. PATENT DOCUMENTS 5,530,643 A 6/1996 Hodorowski
6,275,962 B1 8/2001 Fuller et al.
(Continued)

FOREIGN PATENT DOCUMENTS

CN 103926912 A 7/2014
CN 206489622 U 9/2017
(Continued)

OTHER PUBLICATIONS

BigLadder Software Full Ref, Occupant Thermal Comfort: Engineering Reference, 2014, The Board of Trustees of the University of Illinois and the Regents of the University of California through the Ernest Orlando Lawrence Berkeley National Laboratory (Year: 2014).

(Continued)

*Primary Examiner* — Michael Roswell

(57) ABSTRACT

A controller is described that a building design can be input into, the building design comprising inputting a layout, predefined resources and positions for resources. within the layout. The resources may have a predefined physics nature that includes physics equations, allowable inputs and outputs, etc. The system then can determine how many controllers are needed of what type, and create a guided wiring system. In some implementations a user can control certain aspects of the wiring system, such as how full the individual controllers are and how much money is to be spent on labor versus money spent on equipment.

22 Claims, 12 Drawing Sheets

(51) Int. Cl.

| | |
|---|---|
| *F24F 11/49* | (2018.01) |
| *F24F 11/63* | (2018.01) |
| *F24F 11/88* | (2018.01) |
| *G01R 31/55* | (2020.01) |
| *G05B 13/02* | (2006.01) |
| *G05B 15/02* | (2006.01) |
| *G05B 19/048* | (2006.01) |
| *G05B 23/02* | (2006.01) |
| *G06F 1/3209* | (2019.01) |
| *G06F 1/3246* | (2019.01) |
| *G06F 3/041* | (2006.01) |
| *G06F 3/0482* | (2013.01) |
| *G06F 3/04847* | (2022.01) |
| *G06F 3/147* | (2006.01) |
| *G06F 8/41* | (2018.01) |
| *G06F 8/51* | (2018.01) |
| *G06F 8/53* | (2018.01) |
| *G06F 8/74* | (2018.01) |
| *G06F 9/4401* | (2018.01) |
| *G06F 30/12* | (2020.01) |
| *G06F 30/13* | (2020.01) |
| *G06F 30/18* | (2020.01) |
| *G06Q 30/0283* | (2023.01) |
| *H02J 3/00* | (2006.01) |
| *H04B 3/46* | (2015.01) |
| *H04L 43/50* | (2022.01) |
| *H04L 67/12* | (2022.01) |
| *H04L 67/125* | (2022.01) |
| *H04L 67/75* | (2022.01) |
| *H04M 3/30* | (2006.01) |
| *H04W 4/80* | (2018.01) |
| *H04W 84/00* | (2009.01) |
| *G06F 30/392* | (2020.01) |
| *G06F 111/04* | (2020.01) |
| *G06F 111/16* | (2020.01) |
| *G06F 113/04* | (2020.01) |
| *G06F 113/16* | (2020.01) |
| *G06F 115/12* | (2020.01) |

(52) U.S. Cl.
CPC ............. *F24F 11/88* (2018.01); *G01R 31/55* (2020.01); *G05B 13/0265* (2013.01); *G05B 15/02* (2013.01); *G05B 19/048* (2013.01); *G05B 23/0216* (2013.01); *G05B 23/0264* (2013.01); *G05B 23/0272* (2013.01); *G06F 1/3209* (2013.01); *G06F 1/3246* (2013.01); *G06F 3/04186* (2019.05); *G06F 3/0482* (2013.01); *G06F 3/04847* (2013.01); *G06F 3/147* (2013.01); *G06F 8/436* (2013.01); *G06F 8/51* (2013.01); *G06F 8/53* (2013.01); *G06F 8/74* (2013.01); *G06F 9/4418* (2013.01); *G06F 30/12* (2020.01); *G06F 30/13* (2020.01); *G06F 30/18* (2020.01); *G06Q 30/0283* (2013.01); *H02J 3/00* (2013.01); *H04B 3/46* (2013.01); *H04L 43/50* (2013.01); *H04L 67/12* (2013.01); *H04L 67/125* (2013.01); *H04L 67/75* (2022.05); *H04M 3/305* (2013.01); *H04W 4/80* (2018.02); *H04W 84/00* (2013.01); *H05K 7/1468* (2013.01); *H05K 7/1477* (2013.01); *H05K 7/1481* (2013.01); *G06F 30/392* (2020.01); *G06F 2111/04* (2020.01); *G06F 2111/16* (2020.01); *G06F 2113/04* (2020.01); *G06F 2113/16* (2020.01); *G06F 2115/12* (2020.01); *H02J 2310/12* (2020.01)

(58) Field of Classification Search
CPC ..... G06F 8/51; G06F 8/53; G06F 8/74; G06F 9/4418; G06F 30/12; H02J 3/00; H02J 2310/12; H04B 3/46; H04L 43/50; H04L 67/12; H04L 67/125; H04L 67/75; H04M 3/305; H04W 4/80; H04W 84/00; H05K 7/1468; H05K 7/1477; H05K 7/1481
See application file for complete search history.

(56) References Cited

U.S. PATENT DOCUMENTS

| | | | |
|---|---|---|---|
| 6,301,341 B1 | 10/2001 | Gizara et al. | |
| 6,362,734 B1 | 3/2002 | McQuade et al. | |
| 6,437,692 B1 | 8/2002 | Petite et al. | |
| 6,645,066 B2 | 11/2003 | Gutta et al. | |
| 6,891,838 B1 | 5/2005 | Petite et al. | |
| 7,102,502 B2 | 9/2006 | Autret | |
| 7,304,855 B1 | 12/2007 | Milligan et al. | |
| 7,578,135 B2 | 8/2009 | Mattheis | |
| 7,587,250 B2 | 9/2009 | Coogan et al. | |
| 7,702,421 B2 * | 4/2010 | Sullivan | F24F 11/30 236/51 |
| 7,729,882 B2 | 6/2010 | Seem | |
| 7,734,572 B2 | 6/2010 | Wiemeyer et al. | |
| 7,917,232 B2 | 3/2011 | McCoy et al. | |
| 8,024,054 B2 | 9/2011 | Mairs et al. | |
| 8,099,178 B2 | 1/2012 | Mairs et al. | |
| 8,503,943 B2 | 8/2013 | Spanhake | |
| 8,628,239 B2 | 1/2014 | Merrow et al. | |
| 8,643,476 B2 | 2/2014 | Pinn et al. | |
| 8,749,959 B2 | 6/2014 | Riley et al. | |
| 8,782,619 B2 | 7/2014 | Wu et al. | |
| 8,925,358 B2 | 1/2015 | Kasper | |
| 9,441,847 B2 | 9/2016 | Grohman | |
| 9,521,724 B1 | 12/2016 | Berry et al. | |
| 9,602,301 B2 | 3/2017 | Averitt | |
| 9,664,400 B2 | 5/2017 | Wroblewski et al. | |
| 9,678,494 B2 | 6/2017 | Hyde et al. | |
| 9,740,385 B2 | 8/2017 | Fadell et al. | |
| 9,791,872 B2 | 10/2017 | Wang et al. | |
| 9,857,238 B2 | 1/2018 | Malhotra et al. | |
| 9,860,961 B2 | 1/2018 | Chemel et al. | |
| 9,952,573 B2 | 4/2018 | Sloo et al. | |
| 10,042,730 B2 | 8/2018 | Zebian | |
| 10,094,586 B2 | 10/2018 | Pavlovski et al. | |
| 10,223,721 B1 | 3/2019 | Bhatia | |
| 10,331,259 B2 | 6/2019 | Hotelling et al. | |
| 10,334,758 B1 | 6/2019 | Ramirez et al. | |
| 10,512,143 B1 | 12/2019 | Ikehara et al. | |
| 10,528,016 B2 | 1/2020 | Noboa | |
| 10,557,889 B2 | 2/2020 | Montoya et al. | |
| 10,558,183 B2 | 2/2020 | Piaskowski et al. | |
| 10,558,248 B2 | 2/2020 | Adrian | |
| 10,627,124 B2 | 4/2020 | Walser et al. | |
| 10,640,211 B2 | 5/2020 | Whitten et al. | |
| 10,672,293 B2 | 6/2020 | Labutov et al. | |
| 10,687,435 B2 | 6/2020 | Adrian et al. | |
| 10,736,228 B2 | 8/2020 | Kho et al. | |
| 10,892,946 B2 | 1/2021 | Costa et al. | |
| 10,900,489 B2 | 1/2021 | Rendusara et al. | |
| 10,942,871 B2 | 3/2021 | Cawse et al. | |
| 10,943,444 B2 | 3/2021 | Boyd et al. | |
| 10,966,068 B2 | 3/2021 | Tramiel et al. | |
| 10,966,342 B2 | 3/2021 | Lairsey et al. | |
| 10,969,133 B2 | 4/2021 | Harvey | |
| 11,080,336 B2 | 8/2021 | Van et al. | |
| 11,088,989 B2 | 8/2021 | Gao et al. | |
| 11,222,298 B2 | 1/2022 | Abelow et al. | |
| 11,294,254 B2 | 4/2022 | Patterson et al. | |
| 2003/0020715 A1 | 1/2003 | Sakakura et al. | |
| 2004/0236547 A1 | 11/2004 | Rappaport et al. | |
| 2005/0040247 A1 | 2/2005 | Pouchak | |
| 2007/0067063 A1 | 3/2007 | Ahmed | |
| 2007/0096902 A1 | 5/2007 | Seeley et al. | |
| 2007/0162288 A1 | 7/2007 | Springhart et al. | |

(56) References Cited

U.S. PATENT DOCUMENTS

| | | | |
|---|---|---|---|
| 2008/0183316 A1 | 7/2008 | Clayton | |
| 2008/0277486 A1 | 11/2008 | Seem et al. | |
| 2009/0189764 A1 | 7/2009 | Keller et al. | |
| 2010/0025483 A1 | 2/2010 | Hoeynck et al. | |
| 2010/0131933 A1 | 5/2010 | Kim et al. | |
| 2011/0087988 A1 | 4/2011 | Ray et al. | |
| 2011/0125930 A1 | 5/2011 | Tantos et al. | |
| 2012/0084231 A1* | 4/2012 | McNaught | G06Q 30/0283 705/400 |
| 2012/0102472 A1 | 4/2012 | Wu et al. | |
| 2012/0221986 A1 | 8/2012 | Whitford et al. | |
| 2013/0182558 A1 | 7/2013 | Orten et al. | |
| 2014/0088772 A1 | 3/2014 | Lelkens | |
| 2014/0101082 A1 | 4/2014 | Matsuoka et al. | |
| 2014/0215446 A1 | 7/2014 | Araya et al. | |
| 2014/0277757 A1 | 9/2014 | Wang et al. | |
| 2014/0358291 A1 | 12/2014 | Wells | |
| 2014/0364985 A1 | 12/2014 | Tiwari et al. | |
| 2015/0059522 A1* | 3/2015 | Hughes | F16H 47/06 74/655 |
| 2015/0081928 A1 | 3/2015 | Wintzell et al. | |
| 2015/0198938 A1 | 7/2015 | Steele et al. | |
| 2015/0199088 A1* | 7/2015 | Chandaria | G06F 8/36 715/763 |
| 2015/0234381 A1 | 8/2015 | Ratilla et al. | |
| 2016/0016454 A1 | 1/2016 | Yang et al. | |
| 2016/0062753 A1 | 3/2016 | Champagne | |
| 2016/0073521 A1 | 3/2016 | Marcade et al. | |
| 2016/0086242 A1 | 3/2016 | Schafer et al. | |
| 2016/0088438 A1 | 3/2016 | O'Keeffe | |
| 2016/0092427 A1 | 3/2016 | Bittmann | |
| 2016/0132308 A1 | 5/2016 | Muldoon | |
| 2016/0179340 A1* | 6/2016 | Ogawa | H04B 17/309 715/736 |
| 2016/0195856 A1 | 7/2016 | Spero | |
| 2016/0205784 A1 | 7/2016 | Kyle et al. | |
| 2016/0209868 A1 | 7/2016 | Hartman et al. | |
| 2016/0295663 A1 | 10/2016 | Hyde et al. | |
| 2017/0075323 A1 | 3/2017 | Shrivastava et al. | |
| 2017/0097259 A1 | 4/2017 | Brown et al. | |
| 2017/0131611 A1 | 5/2017 | Brown et al. | |
| 2017/0176034 A1 | 6/2017 | Hussain et al. | |
| 2017/0235848 A1 | 8/2017 | Van et al. | |
| 2017/0322579 A1 | 11/2017 | Goparaju et al. | |
| 2017/0365908 A1 | 12/2017 | Hughes et al. | |
| 2017/0373875 A1 | 12/2017 | Kolasa et al. | |
| 2018/0005195 A1 | 1/2018 | Jacobson | |
| 2018/0075168 A1 | 3/2018 | Tiwari et al. | |
| 2018/0089172 A1 | 3/2018 | Needham | |
| 2018/0123272 A1 | 5/2018 | Mundt et al. | |
| 2018/0202678 A1 | 7/2018 | Ahuja et al. | |
| 2018/0210429 A1 | 7/2018 | Jundt et al. | |
| 2018/0266716 A1 | 9/2018 | Bender et al. | |
| 2018/0307781 A1 | 10/2018 | Byers et al. | |
| 2018/0350180 A1 | 12/2018 | Onischuk et al. | |
| 2019/0011891 A1 | 1/2019 | Davis, II | |
| 2019/0087076 A1 | 3/2019 | Dey et al. | |
| 2019/0138704 A1 | 5/2019 | Shrivastava et al. | |
| 2019/0156443 A1 | 5/2019 | Hall | |
| 2019/0173109 A1 | 6/2019 | Wang | |
| 2019/0278442 A1* | 9/2019 | Liang | G06F 3/0484 |
| 2019/0294018 A1 | 9/2019 | Shrivastava et al. | |
| 2020/0003444 A1 | 1/2020 | Yuan et al. | |
| 2020/0018506 A1 | 1/2020 | Ruiz et al. | |
| 2020/0045519 A1 | 2/2020 | Raleigh et al. | |
| 2020/0050161 A1 | 2/2020 | Noboa | |
| 2020/0150508 A1 | 5/2020 | Patterson et al. | |
| 2020/0182486 A1 | 6/2020 | Haynes et al. | |
| 2020/0187147 A1 | 6/2020 | Meerbeek et al. | |
| 2020/0221269 A1 | 7/2020 | Tramiel et al. | |
| 2020/0226223 A1 | 7/2020 | Reichl | |
| 2020/0228759 A1 | 7/2020 | Ryan et al. | |
| 2020/0255142 A1 | 8/2020 | Whitten et al. | |
| 2020/0279482 A1 | 9/2020 | Berry et al. | |
| 2020/0287786 A1 | 9/2020 | Anderson et al. | |
| 2020/0288558 A1 | 9/2020 | Anderson et al. | |
| 2020/0342526 A1 | 10/2020 | Ablanczy | |
| 2020/0379730 A1 | 12/2020 | Graham et al. | |
| 2020/0387041 A1 | 12/2020 | Shrivastava et al. | |
| 2020/0387129 A1 | 12/2020 | Chandaria | |
| 2021/0073441 A1 | 3/2021 | Austern et al. | |
| 2021/0081504 A1 | 3/2021 | Mccormick et al. | |
| 2021/0081880 A1 | 3/2021 | Bivins et al. | |
| 2021/0123771 A1 | 4/2021 | Vega et al. | |
| 2021/0182660 A1 | 6/2021 | Amirguliyev et al. | |
| 2021/0248286 A1 | 8/2021 | Poluri et al. | |
| 2021/0096824 A1 | 11/2021 | Stump et al. | |
| 2021/0383041 A1 | 12/2021 | Harvey et al. | |
| 2021/0400787 A1 | 12/2021 | Abbo et al. | |
| 2022/0058306 A1 | 2/2022 | Mabote | |
| 2022/0156653 A1 | 5/2022 | Abelow | |
| 2023/0180420 A1 | 6/2023 | Harvey et al. | |
| 2023/0228437 A1 | 7/2023 | Bonvini et al. | |

FOREIGN PATENT DOCUMENTS

| | | |
|---|---|---|
| CN | 206489622 U | 9/2017 |
| IN | 206002869 U | 3/2017 |
| JP | 6301341 B2 | 3/2018 |
| WO | 2008016500 A3 | 3/2008 |
| WO | 2012019328 A1 | 2/2012 |

OTHER PUBLICATIONS

Hagentoft et al. Full Reference, Assessment Method of Numerical Prediction Models for Combined Heat, Air and Moisture Transfer in Building Components: Benchmarks for One-dimensional Cases, Journal of Thermal Env. & Bldg. Sci., vol. 27, No. 4, Apr. 2004.

U.S. Appl. No. 15/995,019 (7340.2.2) Office Action mailed Jul. 26, 2019.

U.S. Appl. No. 15/995,019 (7340.2.2) Office Action mailed Oct. 8, 2020.

U.S. Appl. No. 15/995,019 (7340.2.2) Office Action mailed Apr. 15, 2020.

Amin, Massoud, "Toward self-healing energy infrastructure systems," IEEE Computer Applications in Power 14.1 (2002): pp. 20-28.

Gou, Wenqi, and Mengchu Zhou, "An emerging technology for improved building automation control," 2009, IEEE International Conference on Systems, Man and Cybernetics, IEEE, 2009, pp. 337-342.

Gungor et al., "Industrial Wireless Sensor Networks: Challenges, Design Principles, and Technical Approaches," IEEE Transactions on Industrial Electronics, vol. 56, No. 10, Oct. 2009.

Gou, Wendy et al., "Wireless mesh networks in intelligent building automation control: a survey." International Journal of Intelligent Control and Systems, vol. 16, No. 1, Mar. 2011, 28-36.

Kastner, Wolfgang, et al., "Building Automation System Integration into the Internet of Things, The IoT6 Approach, Its Realization and Validation," Proceedings of the 2014 IEEE Emerging Technology and Factory Automation (ETFA), IEEE, 2014, pp. 1-9 (Year:2014).

Shailendra, Eshan et al., "Analyzing home automation and networking technologies," IEEE Potentials 37.1 (2018): pp. 27-33, (Year: 2018).

Serale G., et al., Model Predictive Control (MPC) for Enhancing Building and HVAC System Energy Efficiency: Problem Formulation, Applications and Opportunities, Energies 2018, 11, 631; doi:10.3390, Mar. 12, 2018.

Siano, P, "Demand response and smart grids—A survey", Renewable and Sustainable Energy Reviews 30 (2014) 461-478.

de Meester et al., SERIF:A Semantic ExeRcise Interchange FormatConference: Proceedings of the 1st International Workshop on LINKed EDucation, Oct. 2015.

Kalagnanam et al., "A System For Automated Mapping of Bill-of_Materials Part Numbers", KDD '04: Proceedings of the tenth ACM SIGKDD international conference on Knowledge discovery and data mining, Aug. 2004, pp. 805-810.

Mouser Electronics News Release, Aug. 16, 2018.

(56) References Cited

OTHER PUBLICATIONS

Ouf et al., Effectiveness of using WiFi technologies to detect and predict building occupancy, Sust. Buildi. 2, 7 (2017).
Radiomaze, Inc., "WiFi signals enable motion recognition throughout the entire home," Dec. 4, 2017.
Sensorswarm, 2018.
Wang et al., "A Practical Multi-Sensor Cooling Demand Estimation Approach Based on Visual Indoor and Outdoor Information Sensing," Sensors 2018, 18, 3591; doi: 10.3390.
Yegulap, Serdar, "What is LLVM? The power behind Swift, Rust, Clang, and more," Infoworld, Mar. 11, 2020.

* cited by examiner

BUILDING AUTOMATION PROGRAMMING USING UI REPRESENTATIONS OF PHYSICAL MODELS

RELATED APPLICATION

The present application hereby incorporates by reference the entirety of, and claims priority to, U.S. Provisional Patent Application Ser. No. 63/070,460 filed 26 Aug. 2020.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure relates to using a controller to automate portions of building wiring diagram creation.

BACKGROUND

Today's "smart buildings" aren't smart at all—just connected. Expensive cloud add-ons that promise to "un-dumb" your control system can only provide low-value results and reduced reliability, all at the cost of more integration effort. Almost all building controls today are model-free. The model-free approach, while simple to implement, becomes quite difficult to manage and optimize as the complexity of the system increases. It also lacks the inherent self-knowledge to provide new approaches to programming, such as model-driven graphical programming, or to govern the interconnections between components and sub-system synergistics. Digital model based approaches to date have been limited in scope and specific to known models defined a-priori. They have thus lacked the ability to enable users to create complex systems of interconnected building zones by ad hoc means, use simple graphical user interfaces to define a system, or enable a digital system model to automate creation and easy updating of point mapping diagrams between devices and the controllers to which they will be wired. Building systems are the world's most complex automated systems. Even the smallest buildings easily have thousands of I/O points—degrees of freedom. In large buildings the I/O points can exceed hundreds of thousands, and with the growth of the IoT industry, the complexity is only growing. Only buildings are given their due respect against comparative cyberphysical systems like autonomous vehicles, Mars rovers, or industrial robotics, can the complexity be addresses.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

In embodiments, a controller system with a processor, memory, a display apparatus, and the controller operationally able to accept a representation of a physical structure is disclosed; the controller operationally able to accept a predefined unit model from a list of predefined unit models displayed on the display apparatus; the controller operationally able to accept placement of the predefined unit model into the representation of the physical structure; and the controller operationally able to create a control system for the physical structure, the predefined unit model, and the controller model, wherein the predefined unit model is represented as being wired to the controller.

In embodiments, a physical representation of at least a portion of the control system is shown on the display apparatus.

In embodiments, the control system for the physical structure comprises a network wiring diagram.

In embodiments, the controller is operationally able to allow a user to use the display apparatus to select a value between high labor cost and high controller cost.

In embodiments, the controller is operationally able to use a fill rate to create the network wiring diagram, wherein the fill rate describes percent of controller connectors that are optimally filled.

In embodiments, the predefined unit model is a resource model or a sensor model.

In embodiments, the predefined unit model comprises a wiring diagram and further comprises generating a network wiring diagram using the wiring diagram.

In embodiments, the controller is operationally able to allow a user to use the display apparatus to modify the network wiring diagram.

In embodiments, the controller is operationally able to modify the network wiring diagram based on user input.

In embodiments, a computer implemented method is disclosed, comprising: a controller with a processor, memory, and a display apparatus accepting a representation of a physical structure; the controller accepting a predefined unit model representation from a list of predefined unit models displayed on a display apparatus; the controller accepting placement of the predefined unit model representation into the representation of the physical structure; and the controller creating a control system for the physical structure, the predefined unit model representation, and the controller representation, wherein the predefined unit model representation is represented as being wired to the controller.

In embodiments, the predefined unit model representation is represented as being wired to the controller through a device interface.

In embodiments, the predefined unit model representation is represented as being wired to a module, the module in communication with the controller through a controller connector.

In embodiments, the predefined unit model representation is represented as being wired to the module through a device connector.

In embodiments, the predefined unit model representation comprises a device, a quanta, a pin layout, or a protocol.

In embodiments, the predefined unit model is able to be modified by a user.

In embodiments, the control system comprises a pin layout display.

In embodiments, the controller further comprises a module, and wherein the controller connects to a device through the module.

In embodiments, the module comprises multiple module types, and wherein a predefined unit module can only attach to certain module types.

In embodiments, the predefined unit module is associated with a physical structure representation location.

In embodiments, a computer-readable storage medium is disclosed, the storage medium configured with data and with instructions that upon execution by at least one processor in a controller system will cause the at least one processor to perform a technical process for creating a user-guided wiring system, the process comprising: a controller accepting a predefined unit model from a list of predefined unit models displayed on a display apparatus; the controller accepting placement of the predefined unit model into a representation of a physical structure; and the controller creating a control system for the physical structure, the predefined unit model, and the controller model, wherein the predefined unit model is represented as being wired to the controller.

These, and other, aspects of the invention will be better appreciated and understood when considered in conjunction with the following description and the accompanying drawings. The following description, while indicating various embodiments of the embodiments and numerous specific details thereof, is given by way of illustration and not of limitation. Many substitutions, modifications, additions or rearrangements may be made within the scope of the embodiments, and the embodiments includes all such substitutions, modifications, additions or rearrangements.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

Figure 1:
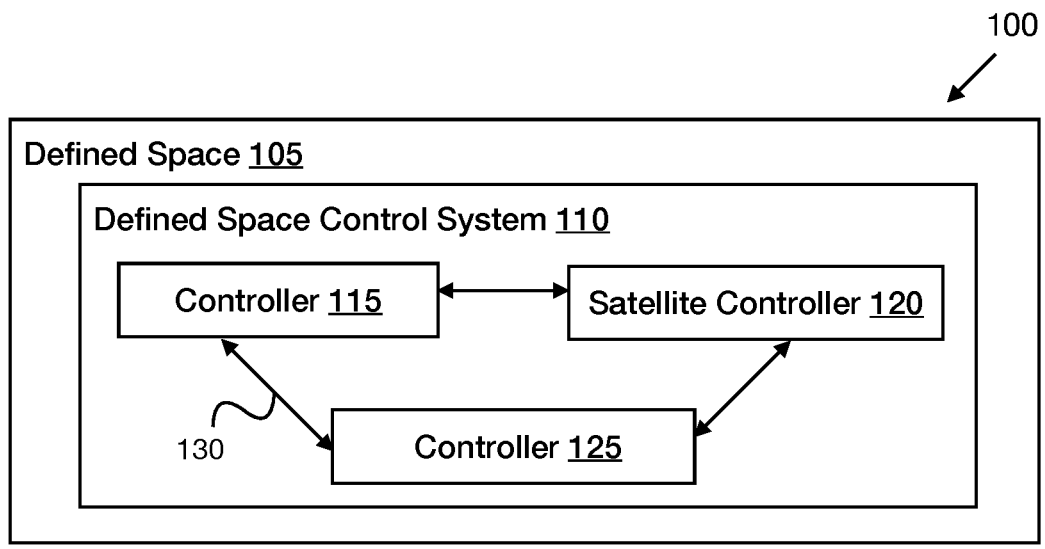
FIG. 1 is a functional block diagram showing an exemplary embodiment of some features of a controller in conjunction which some described embodiments can be implemented.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to systems and methods for automatically creating wiring diagrams. Described embodiments implement one or more of the described technologies.

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments. "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

For convenience, the present disclosure may be described using relative terms including, for example, left, right, top, bottom, front, back, upper, lower, up, and down, as well as others. It is to be understood that these terms are merely used for illustrative purposes and are not meant to be limiting in any manner.

In addition, it is appreciated that the figures provided herewith are for explanation purposes to persons ordinarily skilled in the art and that the drawings are not necessarily drawn to scale. To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). "Program" is used broadly herein, to include applications, kernels, drivers, interrupt handlers, firmware, state machines, libraries, and other code written by programmers (who are also referred to as developers) and/or automatically generated. "Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense). "Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

The technical character of embodiments described herein will be apparent to one of ordinary skill in the art, and will also be apparent in several ways to a wide range of attentive readers. Some embodiments address technical activities that are rooted in computing technology, such as providing an interface to more easily correlate devices and the controllers that they will be wired to. This allows easy changes to controllers during the construction process, as equipment is often moved around, controllers are moved, etc., without requiring days or weeks of effort to recreate the controller I/O wiring. Buildings can also be constructed more efficiently as benefits that are not apparent until the construction process can be implemented with little down-time, as wiring diagrams and point mapping diagrams can easily be recreated. Further, as a building or other physical space can build its controller wiring diagram completely within a single controller (or multiple controllers networked only to each other) the entire system has a level of security unable to be reached with systems that are connected to the greater internet. In a multiple controller system, the different controllers may be self-federating, such that they can choose a master controller, can choose a different master controller if the original master has problems, can chunk computer programs to run on multiple controllers, etc. Other advantages based on the technical characteristics of the teachings will also be apparent to one of skill from the description provided.

I. OVERVIEW

In an embodiment, the controller is an interface between equipment associated with the building and sensors that monitor the building state. In some embodiments, it may replace building control panels in whole or in part. In an illustrative example, the controller comprises a housing with a moveable screen; the moveable screen may be a sliding screen. When the moveable screen is opened, which may require unlocking, the modules of the controller that are wired to various resources in the building are displayed. When the screen is shut, the controller can be used to view building diagrams, resource allocation, etc. Unlock the screen and slide up, and the controller transforms into an installer control center. Real-time wiring feedback, live testing, protocol changes on the fly.

The controller may combine automation needs into a pre-manufactured control panel comprising wiring modules, setup interface, user access point, power supply, bussing, etc. This controller setup may reduce install time by half, and project time by as much as 90%. The screen may be able to be locked and unlocked. When the unlocked screen is moved out of the way of the housing, the controller can transform into an installer control center. Real-time wiring feedback, live testing, and protocol changes on the fly, to name a few functions, may be easily be performed. The controller may have a housing that can be embedded in a wall just deep enough so that the screen is free to move outside the wall, such that the contents of the controller can be displayed.

In some embodiments, a user inputs a defined space layout into a controller system. This layout may be input in a variety of ways, without limitation, by inputting blueprints, by scanning an existing defined space using a 3-d scanning device, by using an interface associated with the controller system to input the defined space layout, etc. Some of the file types that may be used are GBXML, IFC, RESCheck, ComCheck, etc. In some implementations, once a defined space is input, equipment and sensors (devices) are placed within the defined space representation within the control system. The devices are not just an icon, as far as the system is concerned, they, rather, are a piece of equipment that changes one or more types of state (e.g., temperature, humidity, sound, air quality, etc.) at a known rate, and uses energy at a known rate, is attached to other devices, which affects them, and so forth.

The defined space itself may not be just a series of lines. Rather, space portions are defined as objects with underlying physics qualities that define how they react in the world. This may include physics equations that define how they interact with other objects, whose physics equations are also known. This physics is not an unstructured bag-of-math, but rather, it defines what the object is, what it does, how it does it, how it affects other objects around it. Objects may interchange things. These things interchanged (i.e., quanta) may also be defined by physics equations. What quanta are interchanged and how the quanta is changed by the interchange may also be defined. For example, doors and windows diffuse heat into a space rates; different walls with different compositions all may have different state movement rates; hot air in a location in a room diffuses through the air at some state; lamps produce heat at a location that also diffuses, the state in adjoining rooms affect each other, and so forth. In some system, weather and other outside forces can be used to affect defined space behavior.

In some embodiments, a user can add sensors to a building at specific locations. These sensors may be predefined and may be able to be dragged from a panel and then dropped into a specific location by a user. In some embodiments, users can add a variety of devices to a building using similar processes, such as lighting, ventilation, heat sources, cooling sources, solar thermal panels, heat pumps, heat storage, heat exchangers, renewables, VAV components, air components, and/or sensors, etc. These predefined resources are understood as actual physical objects with physics-defined properties that input and output quanta of the appropriate types, in the appropriate amounts, according to each definition.

Once the users adds resources to a building, the user can designate more specifically how the resources behave, and/or affect each other. In some instance this comprises creating control loops. Generally, at the most basic level, control loops comprise a source connected to a transport which is connected to a sink. A sensor may be included. In some implementations when a resources added specific wiring requirements, specifications are also automatically added. For a pump, a non-limiting example of some specifications that might be predefined for a specific pump and added automatically are: its fuel type, horsepower, phase, pump voltage, frequency, rpm, pump type, inlet diameter, outlet diameter, gallons per minute, Max. Total head (static), Maximum pressure (psi), maximum casing pressure, temperature range, port types, etc. Some of these values may later be incorporated into the building controller design to determine what the pump's energy needs are, what the pump can produce, what values are disallowed and indicate the pump is broken, and so on. In some implementations, a user may define some or all specifications for a given resource.

Sources which may be modeled by the system or a user comprise, without limitation, utility generated electricity, site generated electricity, boiler, steam generator, gas turbine, gas heater, chiller, heat pump, adsorption heat pump, ground source heat pump, furnace, air conditioner, photovoltaics, solar hot water collector, wind turbine, hydro turbine, liquid or solid thermal storage tanks, mass thermal storage well, thermal electric generators including peltier junctions, carnot cycle engines, and water sources of irrigation.

Other resources that may be automatically included or user-defined and then included comprise building zones, building surfaces, building surface interlayers, electric batteries, electric loads, outdoor surfaces including snow melt surfaces, irrigation consuming masses, HVAC system equipment, functional control equipment, lights, motors, liquid or solid thermal storage tanks, mass thermal storage, or phase change materials. Transports added and understood by the building system controller may be comprised of pumps, fans, air handlers, dampers, valves, inverters, relays, actuators, linear divers, electromagnets, solenoids, switches, wires, pipes. Other resources that may be automatically included or user-included comprise drivable resources, thermal, energy or water sources or sinks, security systems (which may include camera systems), entertainment systems, etc.

Sensors of the building system controller comprises temperature sensors, flow sensors, humidity sensors, $CO_2$ sensors, radiant temperature sensors, insolation sensors, wind sensors, occupancy sensors, rotational sensors, door movement sensors, rain sensors, snow sensors, light level sensors, etc. Some sensors may have multiple sensor functions. These sensors are able to collect external data feed which may be any of: weather data, tracking outdoor temperature data, wind data, humidity data, insolation data, calendar data, and calendar data of holidays. More particularly, the occupancy sensor may be inferred via indirect data feeds of occupancy activity, including: computer network activity, door sensor activity, mobile device addresses on a local network, acoustic activity, visual occupant and thermal activity.

In an illustrative embodiment the user interface is "drag and drop." The user drags and drops inputs sensors and resources that are to be used within the building into a representation of the building. In some implementations the sensors and equipment are added from a predefined list. When added from a predefined list, information about the equipment (electrical requirements, wiring inputs, and outputs, cost, manufacturer, and supplier) may also be added automatically to the model. In some embodiments, some resource representations have detailed physics descriptions of the resource, inputs and outputs, automatically associated with it. For example, if a pump is selected, there may be 10 or so variables that define the physics of the pump associated with that pump added to the building model/digital twin. Some values further may have only a given range of values allowed. These are stored in the system and used in the simulation model. Some variables can be modified by a user. Some resources may not be controllable by a user, but still added, with their physics descriptions, inputs, outputs, etc.

A structure can comprise multiple zones (such as rooms or specific areas monitored by a sensor). Some zones may not be associated with a sensor. Some zones may overlap with other zones, while some zones do not. The entire structure may be covered in zones, or some locations within a structure may have no explicit zone. These zones can be designated using the user interface.

A building may require multiple controllers. In some embodiments a user chooses the number of controllers. In other systems the system determines how many controllers to use. In such systems, a user can decide if the controller number and placement should be determined based on certain parameters. This process may be done by a constraint solver. These parameters may include cost rate and fill rate. That is, should controller placement be determined based on installation costs or how full each controller is, or on some percentage of each. When the controllers are closer to resources, less wiring is requires which allows labor savings but more controls, and vice/versa. These parameters may be selectable with slider bars on the user interface.

Once some portion of this information is known, then the system can design. The system determines where the controllers are, and develops a point map showing how the wires in the sensors, equipment, and other devices will connect to the controllers. In some embodiments, the system also provides a guided wiring diagram for the electrical wiring in the defined space, such that the diagram can be used to wire the sensors, equipment, and other devices.

Once the wiring diagram has been created, a user can change the location of one or more devices within the controller, and the system will automatically generate a new wiring diagram and make other changes that go along with the new wiring diagram. The system also gives (near) universal protocol translation, in that different protocols are understood and, in some instances, translated into a common protocol used by a controller that can re-translate back to the protocol understood by a given device. In some embodiments, the system determines how many of each kind of I/O module is needed to fill in the controller topology—for example, a controller may have room for eight modules, while a satellite controller may have room for a different number of modules. In some implementations, satellite controllers may hold two modules.

In some embodiments, to determine how many of each kind of I/O module is needed to fill in the controller topology the controller system determines how many pins and of what type the different I/O the different module types have. The controller understands what are the requirements to wire the devices to either it or a different controller on the same system. The controller also understands what the controller device interface is, and which parts of which controllers will accept different devices. If there are devices that cannot be wired appropriately because of the current controller device interfaces, in some systems, the controllers can modify their device interfaces to meet the needs of the devices. In some implementations, the controllers further comprise modules which hold the device interfaces. These module pins (which are a part of the device interface) are then mapped to the device wires. In other implementations, the devices are checked to determine what their wiring needs are; these specific wiring needs are matched to modules. In some embodiments, the controller does not have modules; the devices are mapped directly to the controllers.

In some implementations, locations of the devices within a physical space and their wiring requirements are already know through the model input into the controller. So, wiring paths between a specific device and a location that a controller or a satellite controller is in can be determined; details of how it is to be wired to the controller are also known. In some implementations, once a device is assigned to one or more controller terminals, the controller can modify its controller terminal to match the type of terminal required by the device.

Once the wiring diagram is created, it is not set in stone. Because the system understands what and where each device is, and exactly how it is wired, changes can be easily be made on the user interface, which will then generate a new wiring diagram, changing the parts that have been modified. For example, if a problem arises during construction that requires placing a piece of equipment in a new location, that change can be made to the digital twin—the computer representation—using a controller interface. The system will then generate the new wiring diagram, including the new pin diagram if the piece of equipment needs to be moved to a different controller.

As the controllers understand the deep nature of the objects/devices/equipment that are wired to them, they know what the inputs and outputs for each terminal should be. Each terminal (in some embodiments) have a built in multimeter to ensure the wires are installed correctly in real time. During the controller's self-commissioning sequence, in some embodiments, modules in the controller, the terminals themselves, and/or the controller (satellite controller etc.), test wires for short circuits, cut wires, and proper sensor and equipment connection. In other systems, only some wires are checked.

II. EXEMPLARY AUTOMATIC WIRING DIAGRAM CREATION SYSTEMS

Turning now to FIG. 1, FIG. 1 depicts a system 100 that may be used, in whole, or in part, in any of the embodiments disclosed herein. System 100 may include a defined space 105. The space 105 may be a building, a portion of a building, a zone within a building, a room in a building, a floor of a building, a collection of buildings, a collection of buildings and the grounds around them, a portion of a number of buildings, a garden with an irrigation system, and so forth. A defined space control system 110 may controls aspects of the space 105. The defined space control system 110 may comprise a single controller 115 housed in a single controller box, may be multiple controllers 115, 125 that work together, such as, for example, using distributed systems methods, and so on. The controllers 115, 120, 125 may be connected by a network 130. Network 130 may be a wired or wireless network such as the Internet, an intranet, a LAN, a WAN, a cellular network or another type of network. It will be understood that network 130 may be a combination of multiple different kinds of wired or wireless networks.

These controllers 115, 120, 125 may be capable of mastering the system for the physical space being modeled. At startup, the controllers may vote to elect a leader. If the internal network is damaged, a new leader may be elected, providing I.T. and built-in redundancy. Some controllers may be satellite controllers 120 that comprise a limited set of functions of a controller 115.

Figure 2:
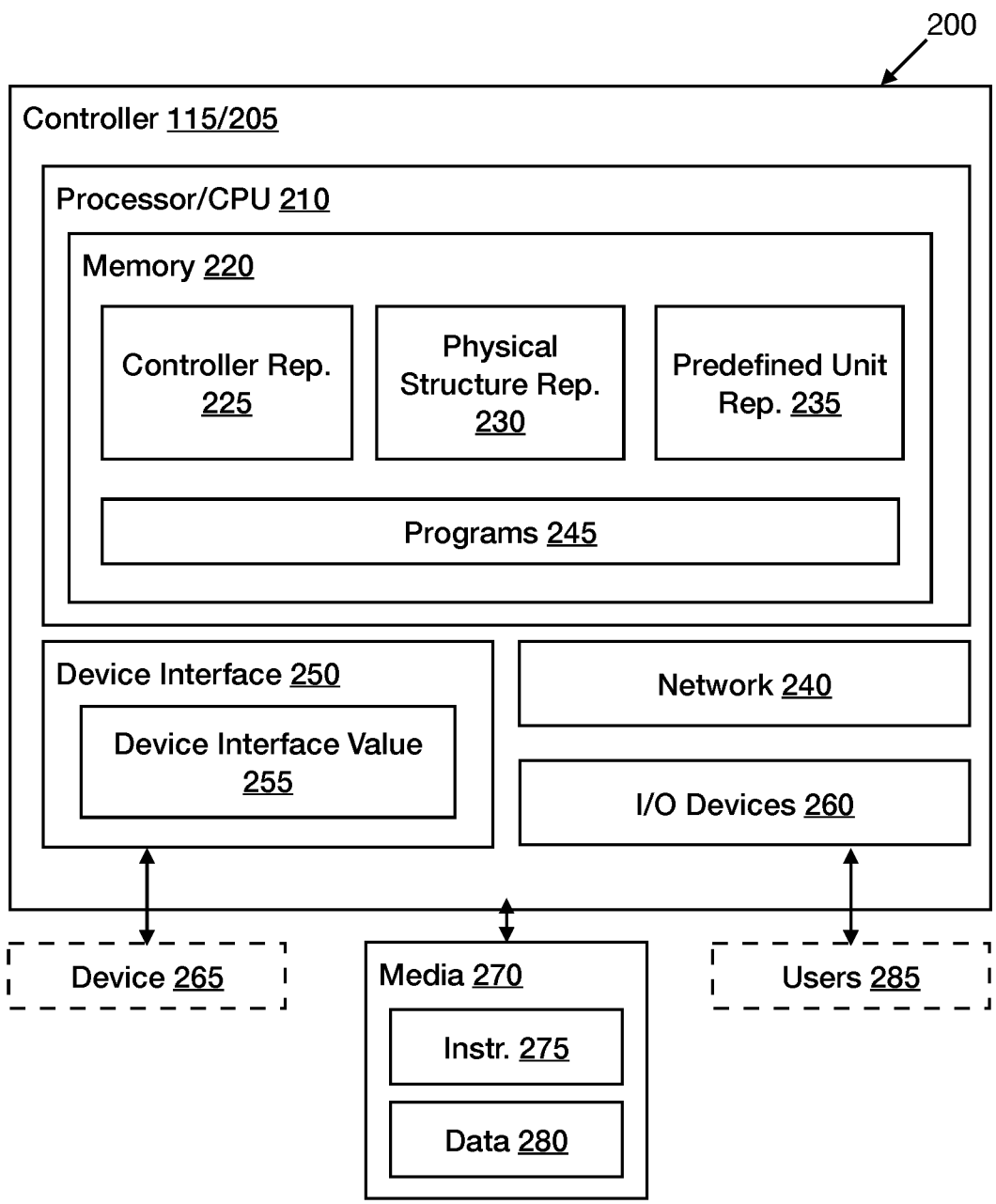
FIG. 2 is a functional block diagram showing an exemplary embodiment of a controller topology pin conjunction with which some described embodiments can be implemented.

Turning now to FIG. 2, FIG. 2 depicts a controller topology 200 that may be used, in whole, or in part, in any of the embodiments disclosed herein. The controller topology 200 may include one or more controllers 205. The controllers may be communicatively coupled to each other over a network 240. The controller 205 may further comprise a processor/CPU 210. Processor/CPU 210 may include memory 220, e.g., read only memory (ROM) and random access memory (RAM), storing processor-executable instructions and one or more processors that execute the processor-executable instructions. In embodiments where processing device 210 includes two or more processors, the processors may operate in a parallel or distributed manner. Processing device 210 may include programs executable on the processor/CPU 210 including those that execute an operating system of information server 245 or software associated with other elements of information server 245.

The memory 220 can be any appropriate volatile or non-volatile storage subsystem. For example, the external memory can be volatile memory, e.g., static memory cells, as in FPGAs and some CPLDs; or non-volatile memory, e.g., FLASH memory, as in some CPLDs, or in any other appropriate type of memory cell.

Memory 220 may comprise a device that stores data generated or received by the network 240. Memory device 220 may include, but is not limited to a hard disc drive, an optical disc drive, and/or a flash memory drive. In embodiments, memory device 220 may be configured to store information received from data sources. The information stored within memory device 220 may be accessed by other elements of information server 120. In embodiments, memory device 220 may include a plurality of entries to implement and run user-interface driven controls. Some of these entries may comprise controller representations 225, physical structure representations 230, and predefined unit representations 235.

A controller representation 225 may comprise a representation of the controller 205, including the number of device interfaces, the specific protocols that are allowed on each device interface, modules that may be plugged into the controller, requirements of different modules that may be plugged into the controller, information about other controllers within a defined space control system 110, information about other controllers that may be added to a defined space control system, etc.

The physical structure representation 230 may include a drawing the actual floor plan using a user interface associated with the controller or importing an already existing floor plan blueprint. The physical structure representation 230 may also comprise a floor plan that incorporates thermodynamic features into thermodynamically similar structures such as walls, windows, ceilings, etc. Some physical structure representations 230 may comprise lower-level thermodynamic features such as, for a wall, a brick layer. a fiberglass layer, and a drywall area, each of which may have its own set of physics equations that determine its nature, including inputs and outputs, as well as its location. Some physical structure representations may comprise using a single representation for a room, or even a building with a set of physics equations that define it and its inputs and outputs, as well as what those inputs and outputs are able to be.

A predefined unit representation 235 may comprise features of a device the predefined unit representation is representing, such as size, number of wires to attach to a controller, the protocol of the wires, pin layout, specific requirements needed for a device interface on a controller to attach to it, and so on. Information needed to connect the device to other devices may also be included. This may comprise quanta—the type of substance exchanged between actors (e.g., water, air, sunshine electricity, etc.). A pump deals in the flow of liquid quants, a fan transports air quanta, a conveyor belt deals with box quanta, etc. Other features, such as the amount of input/output, and other information that may be useful in determining if one device can attach to another many also be included.

I/O devices 260 may include a display apparatus. The display apparatus can be any display that is capable of displaying information in pictorial form. It should be able to accept input from the controller and display that input on a screen. The display apparatus may include a graphical user interface. The term "graphical user interface" may include, but is not limited to being, a touch screen, a physical keyboard, a mouse, a camera, a video camera, a 3D measurement device (e.g., a 3D camera), a microphone, a joystick, a screen, a printer, and/or a speaker. GUI 260 may be configured to receive inputs for creating wiring diagrams.

I/O devices 260 may include a communication device that allows an information server to communicate with another device, such as another controller 125 over network 240. Communication device 260 may include one or more wireless transceivers for performing wireless communication and/or one or more communication ports for performing wired communication. Communication device 260 may also comprise one or more wired connections, and/or a combination of wired and wireless connections.

The controller computer system 205, like other suitable systems, may also include one or more computer-readable non-transient storage media 270. Media 270 may be of different physical types. The media 270 may be volatile memory, non-volatile memory, fixed in place media, removable media, magnetic media, optical media, solid-state media, and/or of other types of physical durable storage media (as opposed to merely a propagated signal). In particular, a configured medium 270 such as a portable external) hard drive, CD, DVD, memory stick, or other removable non-volatile, non-transient memory medium may become functionally a technological part of the computer system when inserted or otherwise installed, making its content accessible for interaction with and use by central processing unit 210. The removable configured medium 270 is an example of a computer-readable storage medium 270. Some other examples of computer-readable storage media 270 include built-in RAM, ROM, hard disks, and other memory storage devices which are not readily removable by users 285. A computer-readable medium should not be considered a signal; neither should a computer-readable memory be considered a signal.

The medium 270 is configured with instructions 275 that are executable by a central processing unit 210; "executable" is used broadly to include, interpretable code, software interpreter code (e.g., bytecode and/or p-code), machine code and/or code that runs using a distributed system, for example. The medium 270 is also configured with data 280 which is created, modified, referenced, and/or otherwise used for technical effect by execution of the instructions 275. The instructions 275 and the data 280 configure the memory or other storage medium 270 in which they reside; when that memory or other computer readable storage medium is a functional part of a given computer system, the computer system may be configured by the instructions 275 and data 280.

Controller 205 is connected to devices 265 (such as any devices that can be connected to an electrical controller or an electrical control panel through a device interface 250. These device interfaces are also called terminal connectors. Devices 265 that can be connected to a controller comprise, without limitation, HVAC equipment, lighting equipment, security equipment, entertainment equipment, etc. Devices have device interface values such as the protocols they run, etc.

Figure 3:
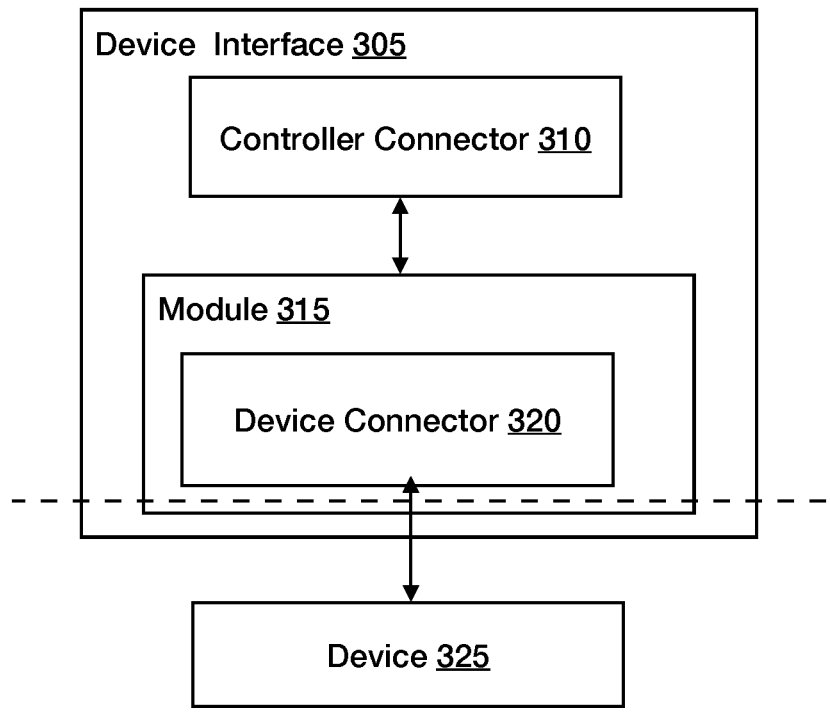
FIG. 3 is a functional block diagram showing an exemplary embodiment of a device interface in conjunction with which some described embodiments can be implemented.

FIG. 3 is a functional block diagram showing an exemplary embodiment of a device interface in conjunction with which some described embodiments can be implemented. FIG. 3 describes the device interface 250, 305, in more detail. In some embodiments, a device interface 305 may comprise a controller 105 attached through a controller connector 310 to a module 315. The module may have a device connector 320 which is attached to a device 325. The controller resource interface 305 is therefore connected to the device 325 through the module 315. The controller connector 310 and the device connector can be any sort of wiring terminal that attaches a device or an intermediary (such as a module) to a controller, as known to those of skill in the art. For example, and without limitation, a device may be physically wired to a wiring terminal, there may be connected by cable connectors (e.g., twisted-pair connectors, coaxial cable connectors, or fiber-optic connectors), USB connectors, pin connectors, and so on.

The device may correspond to a resource that may be wired to the controller, such as a piece of HVAC equipment, a sensor, a security resource, a sound/entertainment system, etc, or any other resource that has the ability to be connected to the controller 105. A device will have a specific protocol, such as the signaling system they expect from the controller, the signals they send to the controller, the current and voltage that they use and report back, etc. One or more of these protocols can comprise the device interface val tie 255.

Figure 4:
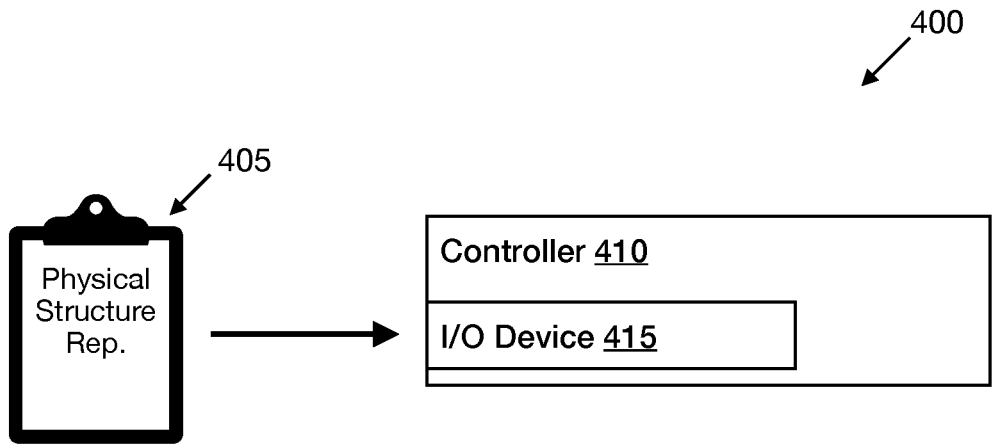
FIG. 4 is a functional block diagram showing an exemplary embodiment of a physical structure representation interfacing with a controller in conjunction with which some described embodiments can be implemented.

FIG. 4 is a functional block diagram 400 showing an exemplary embodiment of a physical structure representation interfacing with a controller in conjunction with which some described embodiments can be implemented. The controller 410 comprises an I/O device 415 which is operationally able to accept representation of a physical structure 405, which may be a blueprint in a computer-readable format 405, may be a room scan (or series of scans of spaces) created using scanning hardware and/or software; the representation of the physical structure may be input into the controller using the I/O device 260, or a combination of methods may be used.

Figure 5:
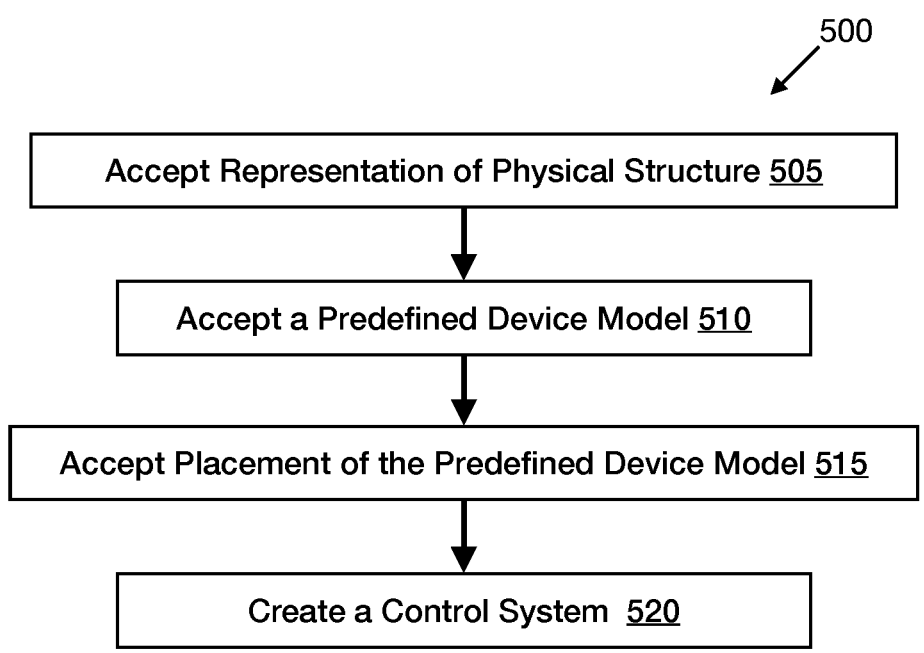
FIG. 5 illustrates a method for creating and modifying a controller-device connection conjunction with which some described embodiments can be implemented.

FIG. 5 illustrates a method 500 for creating and modifying a controller-device connection in conjunction with which some described embodiments can be implemented. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., distributed networked controllers, a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At operation 505, a representation of a physical structure is accepted. This representation may be accepted into memory 220. Conventional automation systems know nothing about buildings; nothing about the overall way discrete parts of a building interact, nothing about how a resource affects the various zones about it; nothing about how a resource works. Prior art requires weeks of programming to create a representation of a physical structure. The word "structure" should be understood to mean a structure or a portion of a structure. Creating the representation of the physical structure may include drawing the actual floor plan using a user interface or importing an already existing floor plan. In some embodiments, the existing structure is scanned with a 3-D scanner to create a physical representation, then the scan is imported to the controller. Once the floor plan exists within the system, each layer of the building that behaves differently thermodynamically may be input. For example, a wall may consist of a brick layer, a fiberglass insulation layer, and a drywall layer. Each of these layers maybe input, or the wall may be treated as a whole. Another wall in the same building may be comprised of different layers. Floors, ceilings, and windows also have their own layers with their own thermodynamic characteristics.

In some implementations, input of the layer types happens automatically—it can be read from the blueprint. In other systems, the layers are input by hand, using a user interface on a display apparatus. In some implementations the different layer types are predefined and displayed on a user interface screen, and the user matches the layer types with the specific layers in the building representation. When predefined layers are known, the system may already know thermodynamic characteristics of such layers. In some implementations, the user inputs the thermodynamic characteristics of the layers. In some embodiments, only the size of the building is input. At operation 510, the controller is operationally able to accept a predefined unit model from a list of predefined unit models displayed on a display apparatus, e.g., 260.

Figure 6:
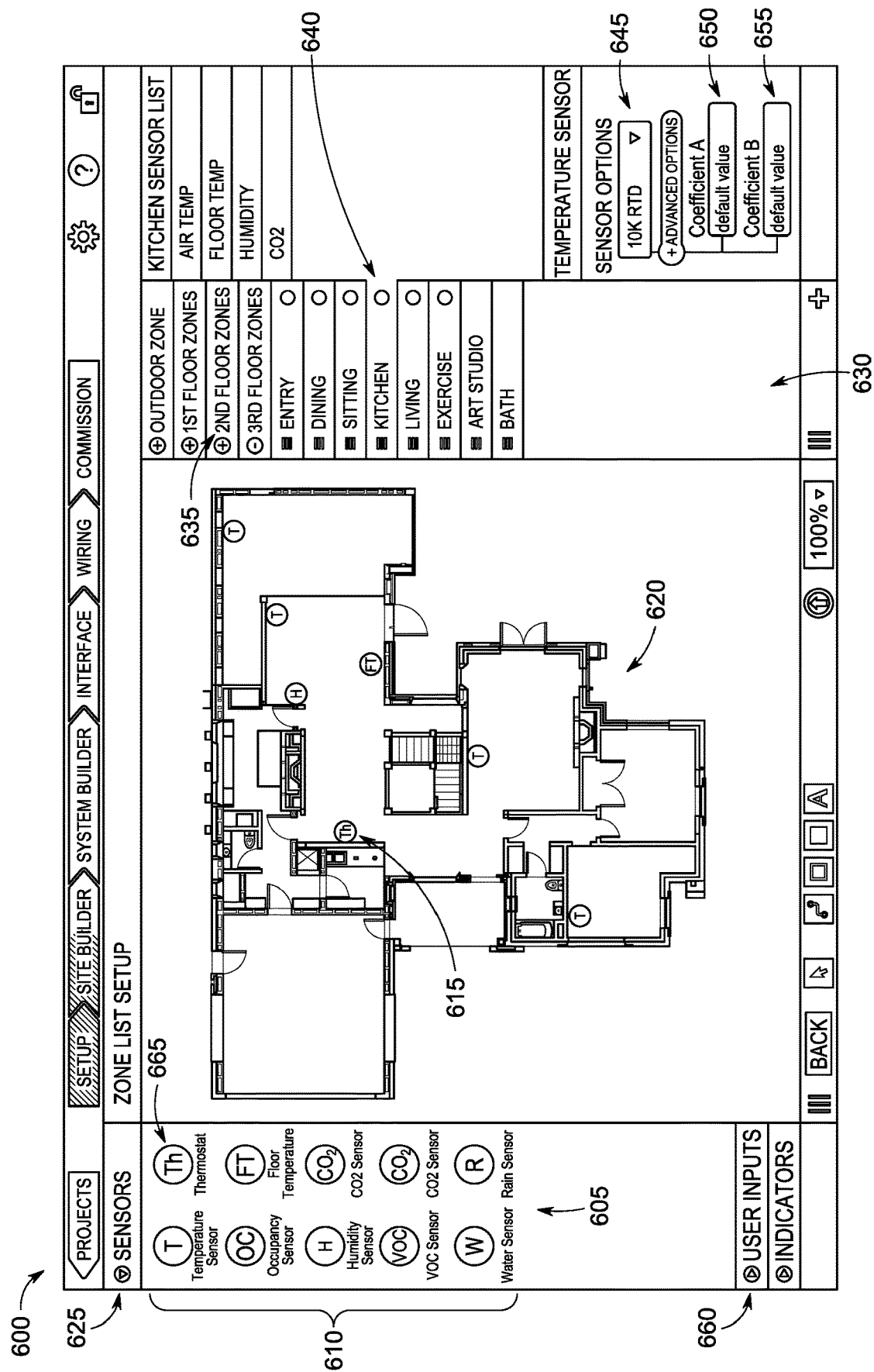
FIG. 6 depicts a graphical representation of at least a portion of a control system in conjunction with which some described embodiments can be implemented.

FIG. 6 depicts an exemplary user interface screen 600 which enables users to use physical representations of physical models to define a controller layout. A user may chose a predefined unit model 605 from a list of predefined unit modules 610 using a WYSIWYG interface. Specifically, a user selects a type of unit model, such as a thermostat 665, a user input 660, an indicator, a heat source, a solar source, a pump, and so on. Predefined unit models may be grouped, such that multiple types of similar resources may be displayed together 610; this case, sensors. Once a unit model 665 has been chosen (in this case, a thermostat), a user can use a cursor, a mouse, their finger, etc. to place the unit model 615 within a graphic representation of the physical structure, e.g., 620. This allows the controller to know where the device is within the defined space.

A specific unit model may not have a standard function in one or more areas. In such a case, a user may input values for that, type of unit model. In the illustrated model, a temperature sensor has options 645 that are available from a drop-down menu. Each of those options has other sub-options: e.g., Coefficient A 650, Coefficient 1 3655 associated with it, which define the unit model with more particularity. Different options may have different sub-options associated with them.

A unit model is given a label that defines at least one of the type of resource, the subtype, specific features about the resource, such as options and sub-options, the resource location within the control system, etc.

In some embodiments, the following basic graphic concepts are used.

LEFT DRAWERS: Far left drawers 625 provide general categories of unit models. When a drawer is opened, specific predefined unit representations that can be chosen are exposed. The illustrative example shows sensor models.

MAIN GRAPH PANELS: The defined space graph panel 620 provides an overall drawing of a defined space that is being worked on. Moving a predefined unit representation 235 onto the defined space graph panel 620 may signal to the controller that a device 265 represented by the predefined unit representation 235 will be located at a corresponding spot to the physical structure representation 230 within the defined space 105.

RIGHT DRAWERS: Shown here to the right of the main graph panel at 630, these drawers provide a user with a way to modify a chosen physical structure representation 230. By doing so, the controller modifies the features of a device 265 associated with the physical structure representation 230.

Resources that are known to the system may be input into the system using an interface 600. This process includes labeling the resource. By doing so, the system then understands the behavior of the resource. Resources that have unusual characteristics or that are unknown to the system may have details that describe them input by hand. These specifications may be by resource type, and may request standard physical behavior 650, 655. Resources may also be put in with more unknown characteristics.

At operation 515, placement of the predefined device model is accepted. In an illustrative embodiment, once a user has placed the representation of the unit model within the representation of the physical structure, the controller is operationally able to accept the placement location of the predefined unit model type 615, at the location shown. In some implementations, the physical model may be divided, with just a portion displayed at a named location 635. These divisions are sometimes called zones. Possible divisions are: outdoor zone, first floor zones, second floor zones, third floor zones Once a division is chosen, further subdivisions 640 may be chosen. Such subdivisions may comprise named portions of the structure such as entry, dining. sitting, kitchen, living, exercise, air studio, bath. The specific divisions and subdivisions may depend on the physical structure and how it has been represented within the controller.

At operation 520, the controller is operationally able to create a control system for the physical structure, the predefined unit model, and the controller model, with the predefined unit model represented as being wired to the controller.

Figure 7:
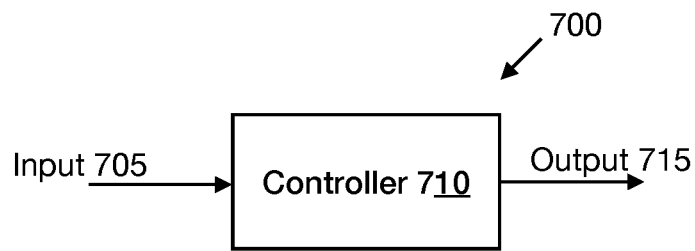
FIG. 7 depicts one topology that depicts a possible control system in conjunction with which some described embodiments can be implemented.

FIG. 7 depicts one topology 700 that depicts a possible control system. With reference to FIG. 7, a control system is a system 710 whose output 715 can be managed (controlled or regulated) by modifying its input 705.

Figure 8:
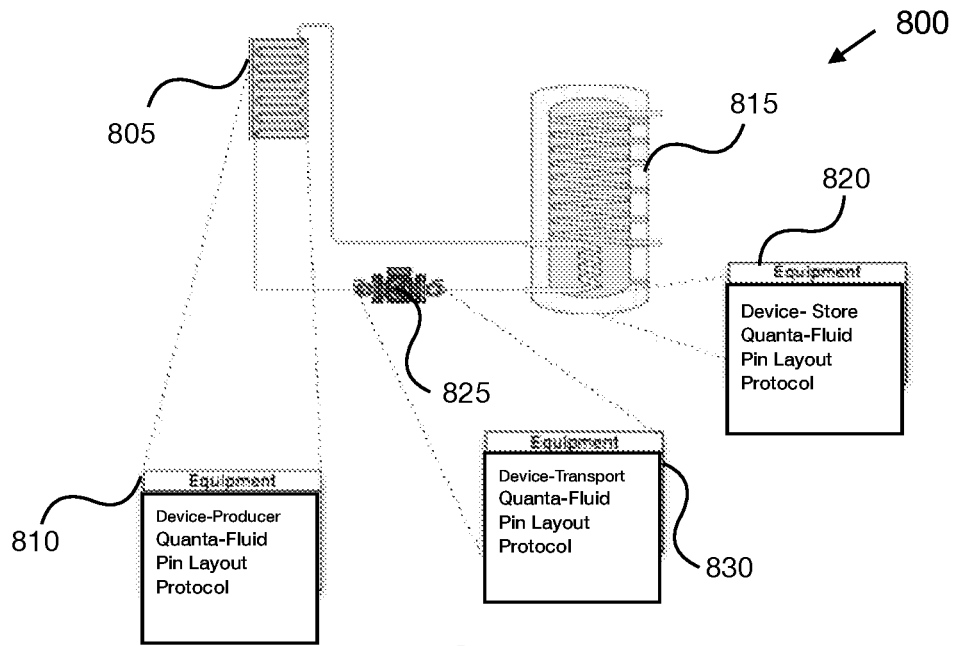
FIG. 8 depicts an exemplary control system in conjunction with which some described embodiments can be implemented.

FIG. 8 depicts a simple control system 800. This exemplary system comprises three units, a solar panel 805, a pump 825, and a hot water tank 815 that uses the solar panel energy to heat up water. These units have specifications. Some possible solar panel specifications are shown at 810, some possible hot water heater specifications at 820, and some possible pump specifications at 830. In some embodiments, a predefined unit model further comprises information such as type of device [eg., producer, consumer, transformer (transforms from one quanta to other), transport, store, router, etc.); quanta, i.e., kind of matter that is used (e.g., fluid, thermal, mechanical, fuel, etc.); and other information associated with a unit, such as the specific pin layout needed for wiring, the protocol; e.g., the set of control signals that the controller will use to control the device, that the device used to signal to the controller, such as error codes, etc. This information includes inputs and outputs, as represented by the lines connecting the unit models.

Figure 9:
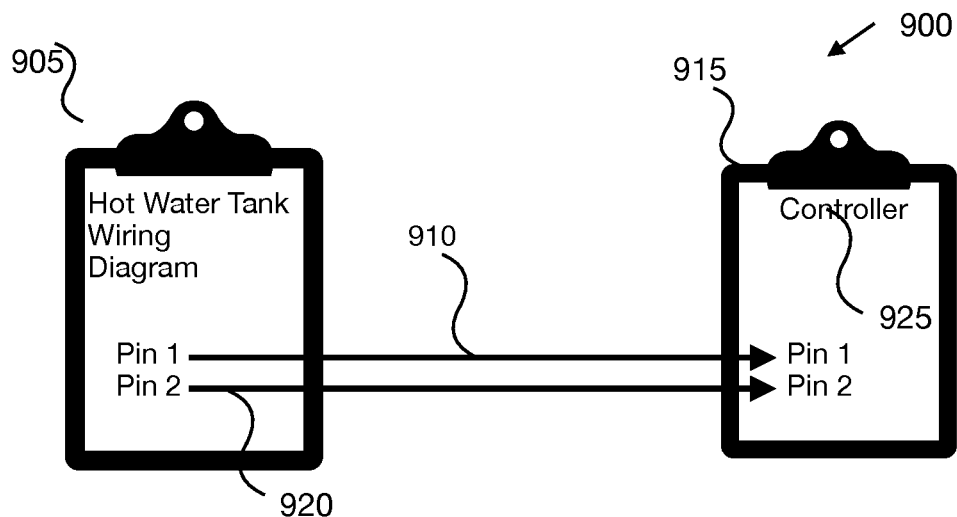
FIG. 9 depicts an example correlation between a unit model and a controller in conjunction with which some described embodiments can be implemented.

FIG. 9 depicts an example correlation between a unit model and a controller 900. An exemplary simplified hot water tank wiring diagram is shown at 905. It comprises wiring definitions for pins used to wire the hot water tank to a controller 915. The controller understands the nature of the physical structure of the unit model (such as a hot water tank 815), the location of the unit model (see FIG. 6), and the location of the controller is in, and so can determine the wire route and amount of wire necessary to wire the hot water tank to the controller. It may also understand more specific construction requirements, such as brackets and wiring harnesses that are used to wire the hot water tank to the controller (see FIG. 4). In embodiments, the controller also understands the wiring requirements 910, 920 and so can determine what sort of wiring pins 925 are needed at the controller. The controller can use its processor 210 and memory 220 to use the described information to create a control system, which may comprise a network wiring diagram.

Figure 10:
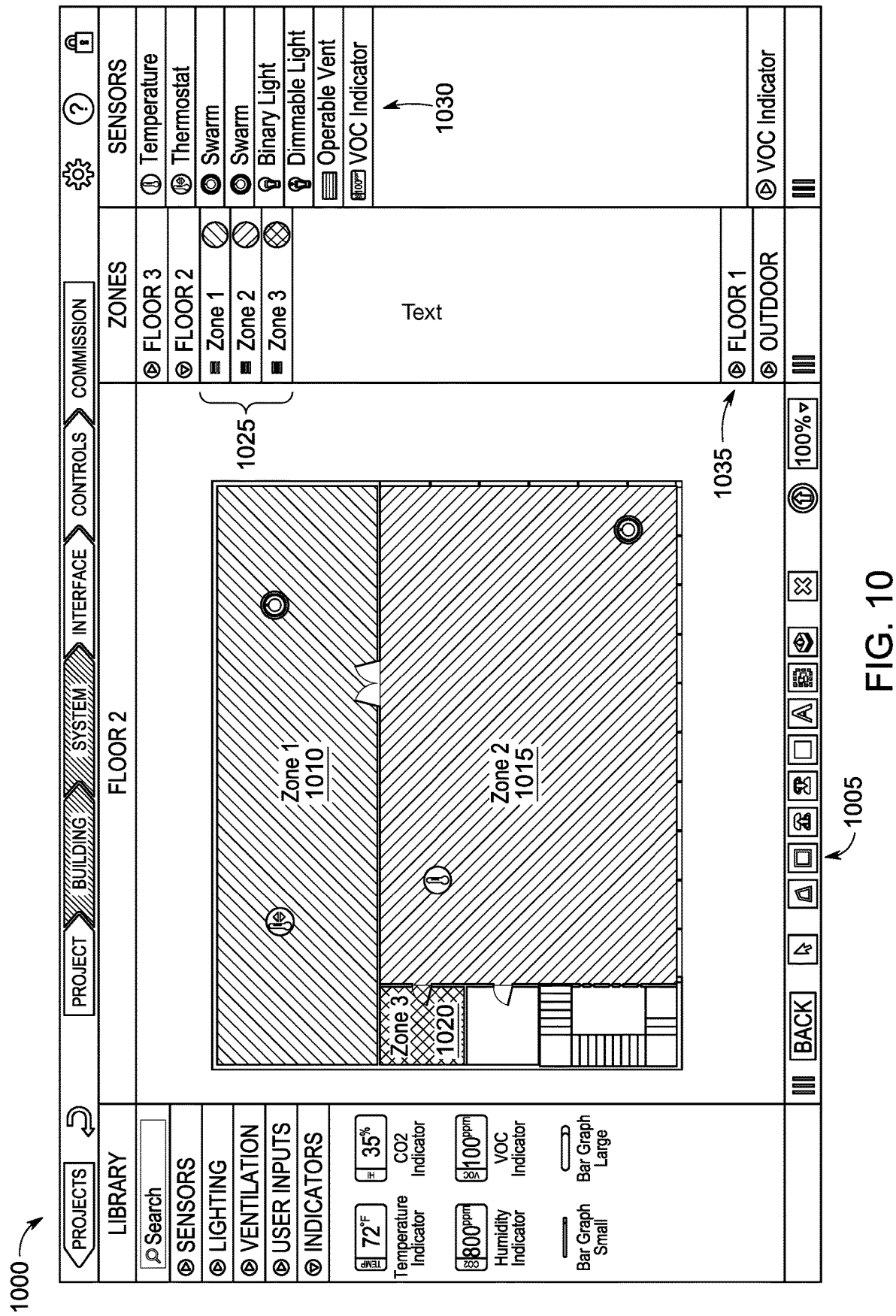
FIG. 10 depicts an exemplary screen shot with which zones can be created.

FIG. 10 depicts an exemplary user interface screen 1000 which enables users set up zones within a structure representation on a display apparatus. A zone icon 1005 may be selected. The zone may then be drawn over top of a portion of the physical structure representation as seen with reference to Zone 1 1010, Zone 2 1015, and Zone 3 1020. The zones may be shown in a panel 1025 that also shows which sub-portion of a physical structure representation is showing on the display device, e.g., Floor 2 1035. Resources, such as sensors, already placed in the zone, or in a larger subsystem, may be displayed on another panel 1030.

Figure 11:
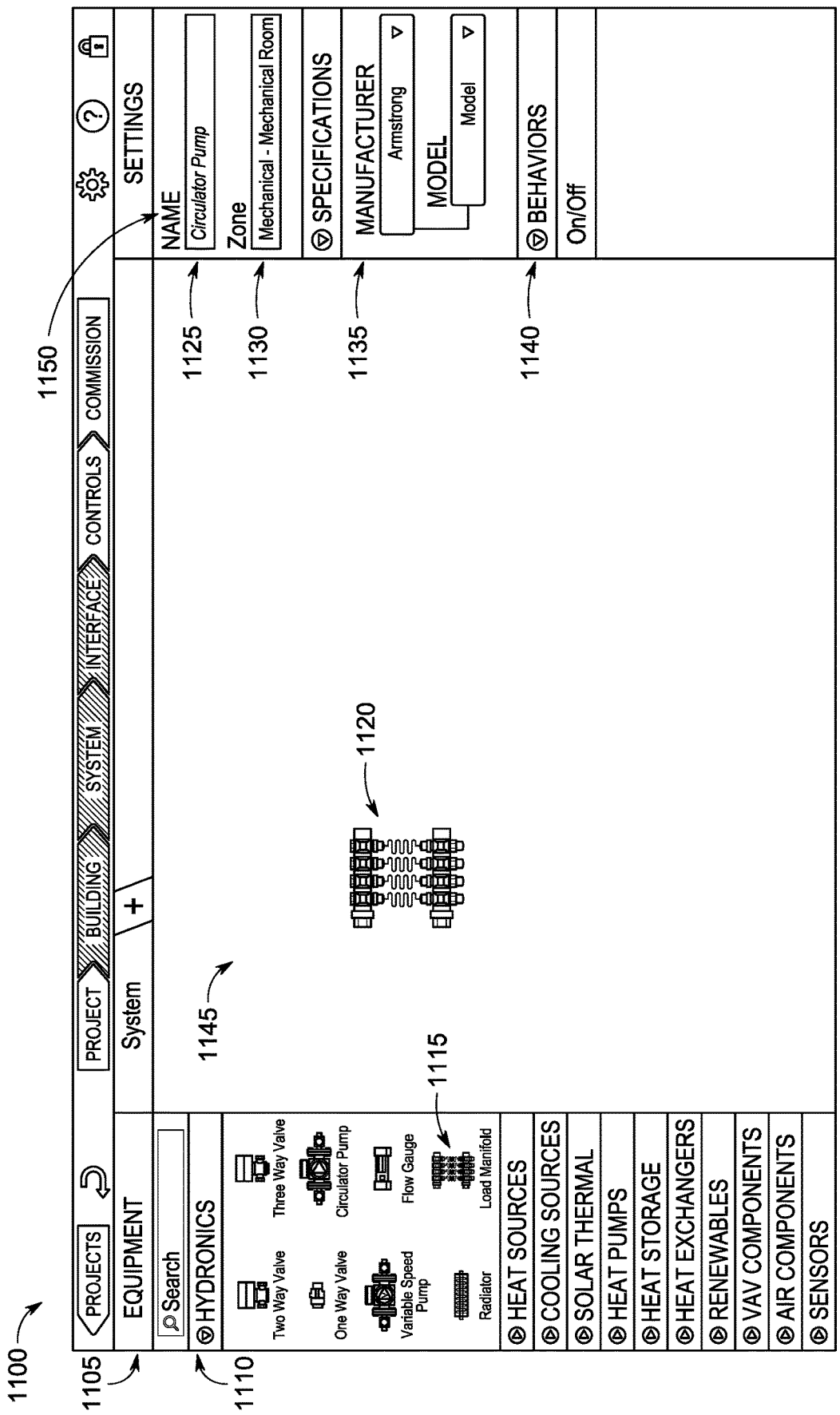
FIGS. 11 and 12 depict exemplary screen shots with which resources can be placed and defined.
Figure 12:
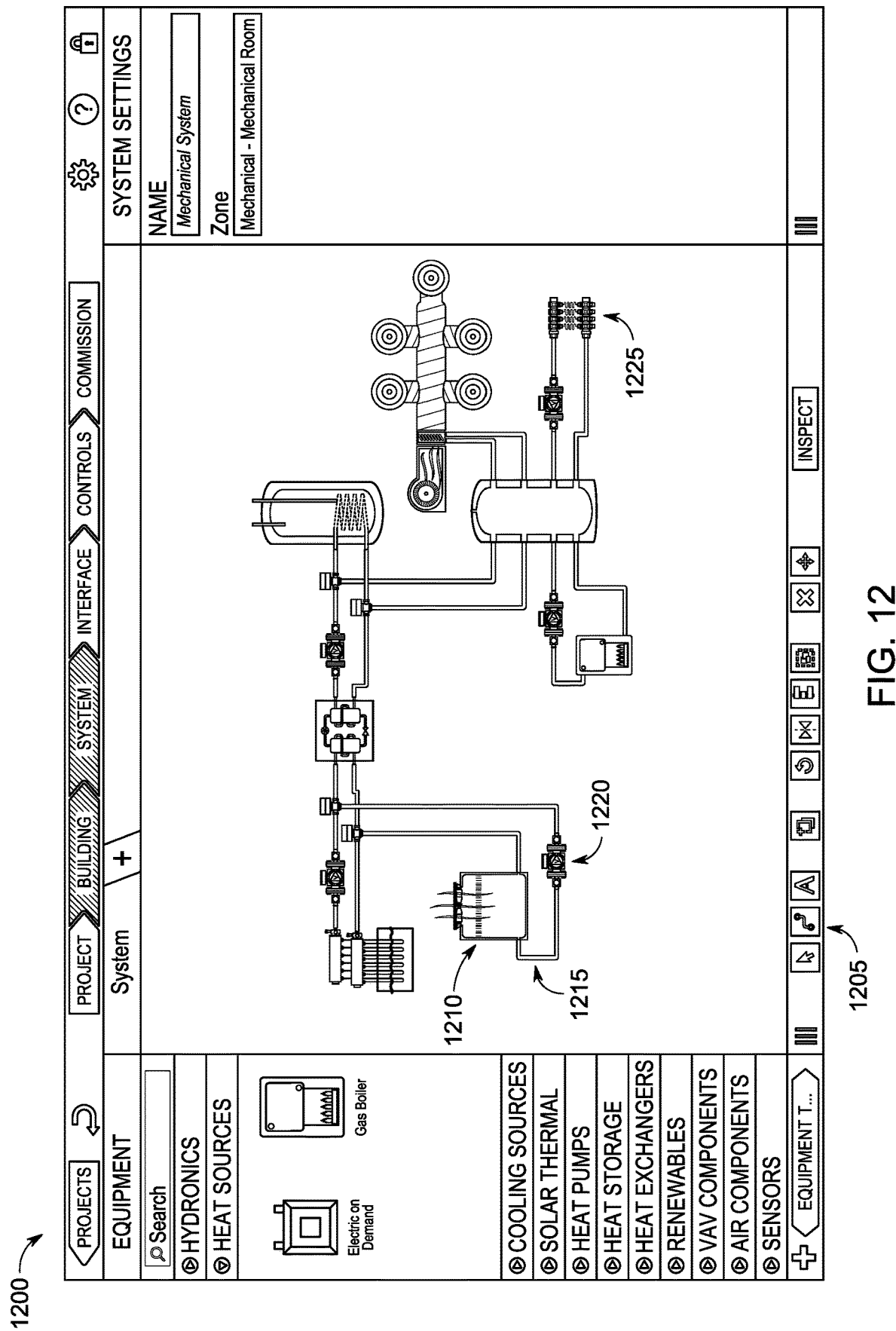

FIG. 11 depicts an exemplary user interface screen 1100 which enables users to create interconnected resource systems within a zone on a display apparatus. In some embodiments, an equipment panel 1105 has a series of drawers 1110 that can be opened to display predefined unit models 1115. Choosing a drawer opens it up. In the example shown, "Hydronics" 1110 has been opened, displaying the hydronics options. Many sorts of equipment (e.g., predefined unit models), such as heat sources, cooling sources, solar thermal sources (such as solar panels), heat pumps, hydronics systems, heat storage, heat exchangers, renewables, VAV components, air components, sensors, irrigation systems, sprinkler systems, etc., may all have predefined unit models associated with drawers. Choosing a drawer opens it up. A predefined unit model 1115 can then be selected and placed 1120 in a system panel 1145. Selecting a predefined unit model that has been placed may display a settings panel 1150 that allows the predefined unit model to be modified by a user. The settings panel may comprise a name of the predefined unit model 1125, e.g., "circulator pump". The zone in which the predefined unit model resides, or which the predefined unit model affects can be set in a zone field 1130. In some embodiments, multiple zones may be specified for a single predefined resource model. Specifications about the predefined unit model may be able to be modified. These modifications may be specific to the type of predefined unit model. That is, a load manifold 1115 may have different specifications the a variable speed pump, etc. Some specifications that may be modified may comprise manufacturer 1135, model, behaviors such as on/off 1140, percent on, etc. The predefined unit models comprise pin diagrams and protocols for pins, inputs and outputs, FIG. 12 depicts an exemplary interconnected resource system 1200. Once predefined unit models are placed, connections 1215 between the predefined unit models can be drawn. For example, a user may be able to select a connector tool 1205, select and place a predefined unit model 1210, then select and place another predefined unit model 1210. A connection 1215 may then automatically be drawn between the two. The user may also be able to draw connections themself. An already placed unit model may be able to be moved around. The load manifold 1120 moves to the far-right 1225 in a completed system shown in FIG. 12. Because the predefined unit models understand the nature of their inputs and outputs, in some systems, the system may ensure that the chosen system connectors actually work. If a predefined unit model is connected by a user to another predefined unit model that does not fit for some reason, such as the quanta used as output is not used as input for the downstream connected predefined unit model, there may be an error message to warn of the problem, or the difficulties may be shown in a different way.

Figure 13:
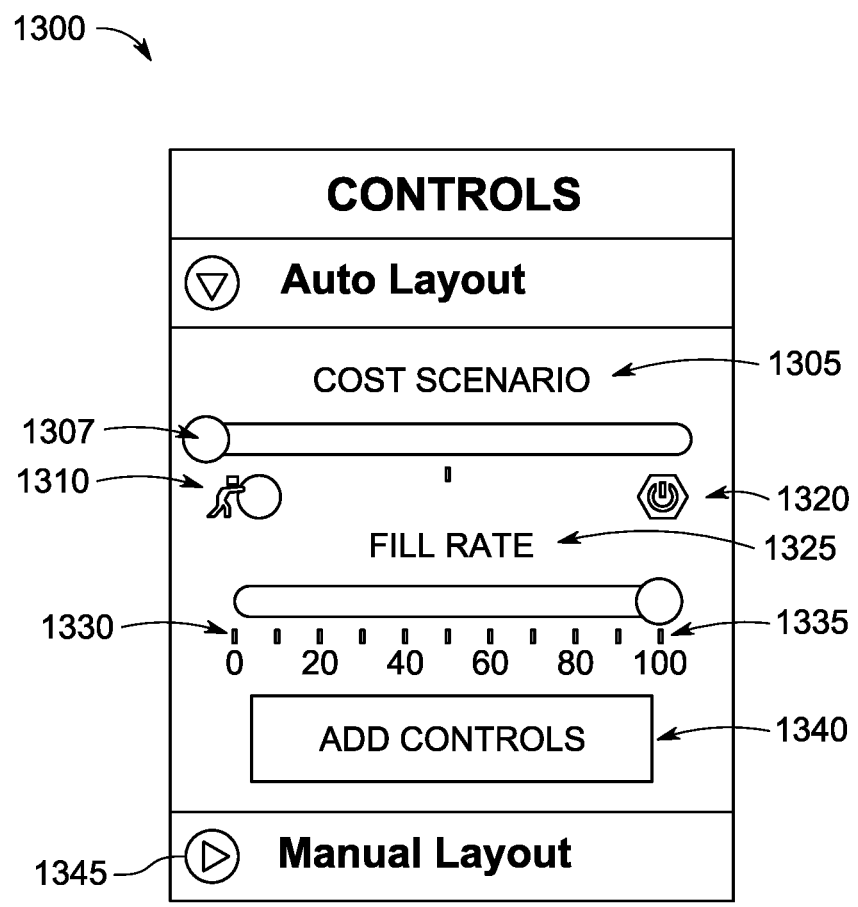
FIG. 13 depicts depicts controller placement layout options in conjunction with which some described embodiments can be implemented.

FIG. 13 is an exemplary diagram showing potential wiring constraints that can be used in some embodiments. Once the interconnected resource system has been created, certain constraints can be placed on automatic controller placement. Controllers can be wired to some number of units. The number of devices that are able to be wired to a given controller depends on the controller and the device, in that different devices have different amount of wires to be wired to device connectors in the controller, and different controllers may have different numbers of device connectors. Large systems will need multiple controllers. How the controllers should be placed has some constraints that users can modify. In some embodiments, a constraint can be input by a user on a user interface, as shown at 1300. In some embodiments, constraints are accepted a different way. Controllers can be wired to some number of unit models (e.g., equipment, resources, sensors, etc.). One of the possible constraints is a cost scenario 1305 which allows a user to choose between higher labor costs and higher equipment cost. In an exemplary embodiment, a cost scenario slider 1307 goes from high labor costs (indicated by the icon of a human rolling a large ball 1310) to high equipment costs (indicated by the icon of a power switch 1320). A user can accept a constraint by setting the slider thumb to a value somewhere between high labor cost and high equipment cost. When higher labor cost is chosen, the number of controllers is minimized, as fewer controllers will be used, but the devices will be further from their controller. This increases the average length from the controller any given device is, requiring more labor to install.

In some embodiments, another possible constraint is "Fill Rate" 1325. Fill rate indicates how full each of the controllers should be, which may be listed in percentages (0% 1330, 20%, 40%, . . . 100% 1335), though other methods are envisioned, as well. A high fill rate saves money on controllers, but most likely raises installation costs, as, on average, the controllers will be further from the resources they will be wired to. When a low controller fill rate is chosen, such as 40%, it also provides more room for future unit models to be added to the controller, thus minimizing new controller installation costs. When the thumb of the slider bar is all the way over on the left side, there will be the fewest devices allocated per controller, which will give more room for expansion. When the thumb of the slider bar is all the way over on the right side, the number of devices per controller will be maximized, which will give lower costs. In some embodiments, a button 1340 may automatically generate a network wiring diagram. In some embodiments, another button 1345 may allow a user to create a network wiring diagram. FIG.

Figure 14:
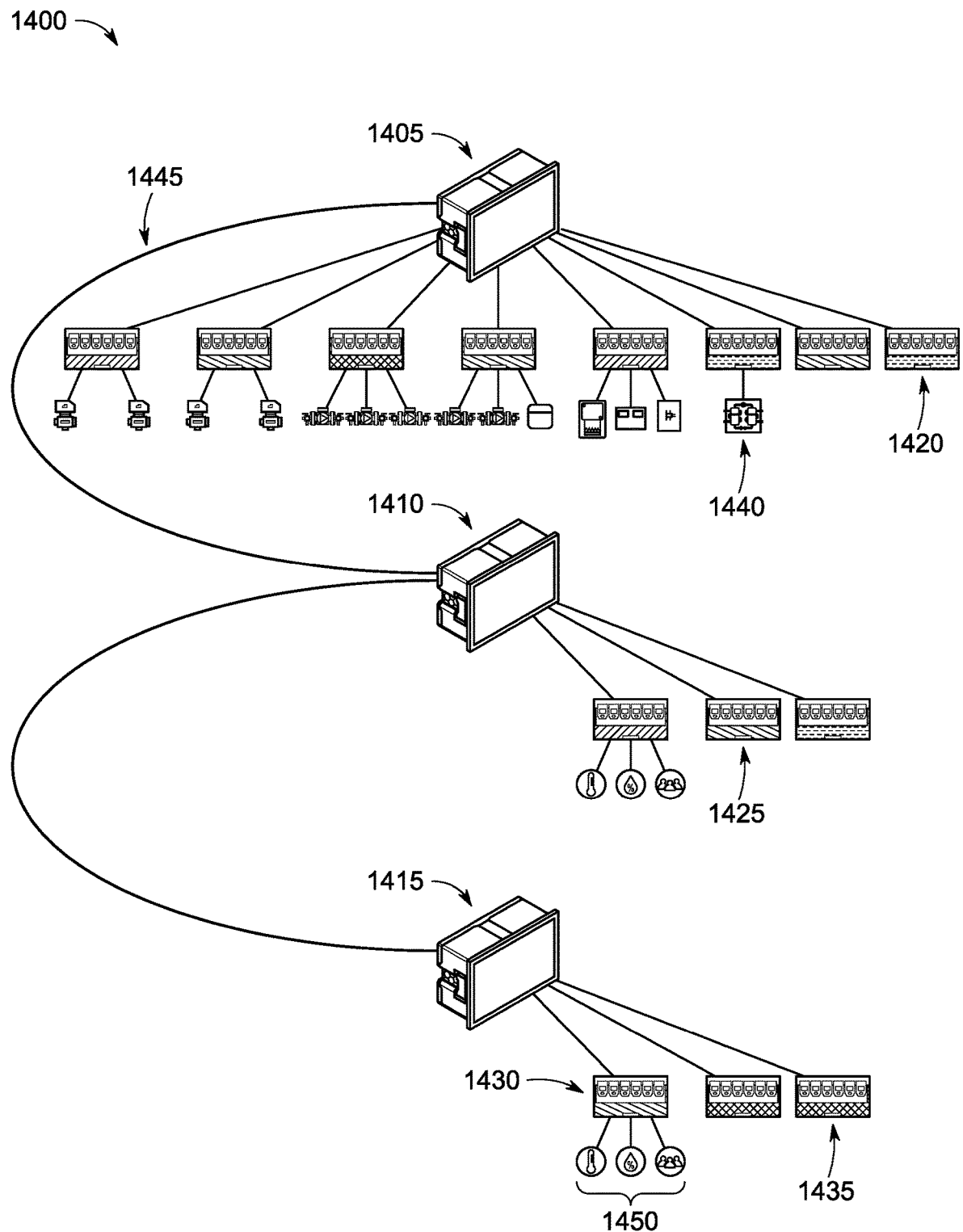
FIG. 14 depicts an exemplary network wiring diagram.

FIG. 14 depicts an exemplary network wiring diagram 1400. When predefined unit representations are accepted into a representation of a physical structure, then the controller is operationally able to create a control system for the physical structure. The control system may comprise a wiring diagram of the controller and the predefined unit model, a network wiring diagram comprising multiple controllers wired together, etc. In the given example, the network wiring comprises three controllers 1405, 1410, 1415 are shown connected 1445 using a wired connection. The controllers have modules 1420 associated with them. The modules themselves have devices 1440 connected to them. In some embodiments, the modules are of different types, e.g., 1420, 1425, 1430, and 1435 may all be of different types. The modules may have predefined unit representations previously defined as resource or sensor representations 1440, 1450 associated with them. In some embodiments, users may move predefined unit representations from one controller to another, or one module to another. For example the predefined unit representation 1440 may be moved by a user to a location on module 1420. The user may use a sWYSIWYG interface to select a given predefined unit representation and then move it to a new position. If modules of different types are used, then a predefined unit representation may be required to be moved to a module of a different type.

Figure 15:
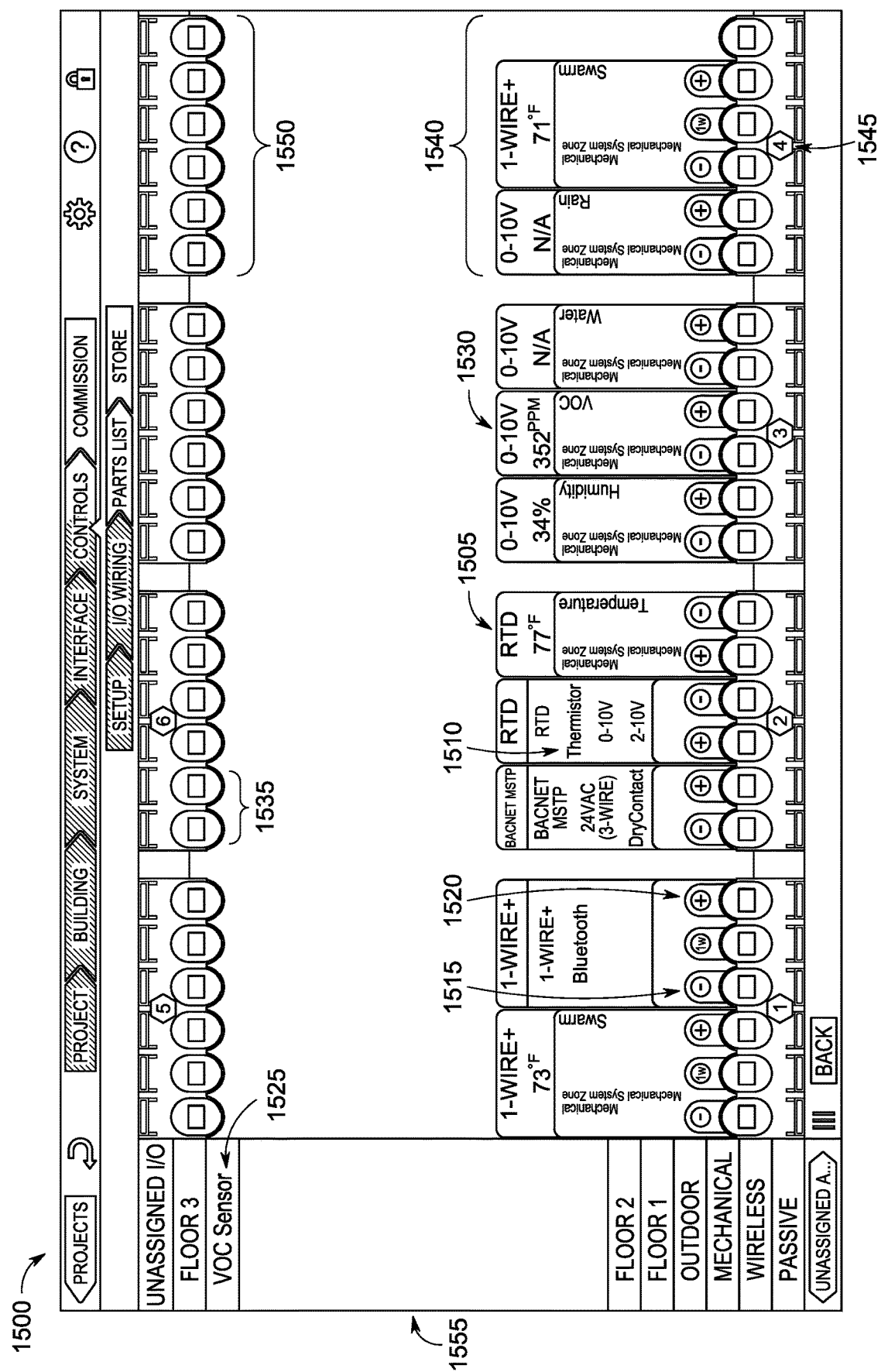
FIG. 15 depicts an exemplary screen shot with which point maps can be modified.

FIG. 15 discloses an illustrative screenshoot embodiment of a pin layout display 1500 that allows a user to set up and/or modify a controller unit model layout, which may include pin layout. A controller 205 may have database(s) of predefined unit representations 235 stored within its memory 220 that a user can choose to add to specific locations on the controller 205. An example is the VOC sensor 1525. This may be used when a network wiring diagram 1400 does not include a predefined unit representation that has been placed within a physical structure representation using screens discussed with reference to FIGS. 6, 11, and 12, is not currently represented within a network wiring diagram (e.g., FIG. 14). The database may be distributed amongst controllers belonging to a distributed controller system. The controller may automatically place the unit models on a default controller representation screen 1500. This screen 1500 may be reached through a network wiring diagram 1400. For example, choosing a controller, e.g., 1405 may open up a controller pin layout screen 1500. The pin layout screen may compose a controller representation 1500 with modules 1540 indicated 1545. The modules may be indicated with a number 1545, a color, or through a different method. There may be empty device connectors with no modules 1550 indicated.

A user may move predefined unit representations around on the controller representation screen 1500, using wysiwyg inputs, or a different type of input known to those of skill in the art. A user may also modify pin layouts associated with device models. Moving around the predefined unit representations (or device wire pin layouts within a predefined unit representation) on the screen 1500 may reset controller expectations of what the controller wire connection expects. A user may swap wires on a specific device representation on the moveable interactive display, which will change the types of wires that the controller expects at the specific locations where the wires were swiped on the moveable interactive display. For example, the (−) wire 1515 representation may be swapped with the (+) wire representation 1520 on the same predefined unit representation—1-Wire Bluetooth. This will change the protocol that the controller expects on those wires. When the device itself is wired to the controller, the controller will expect the new, swapped, protocols.

Whole predefined unit representations can be moved. The temperature sensor representation 1505 can be moved by a user to, for example, three open slots on module 6 1535, etc. These modifications will change the protocol that the controller expects on the eventual wires that a device 265 represented by the predefined unit representation, e.g. 1535, is moved to. In some embodiments, the controller may send a signal through the module connector to the device connector 320.

An aspect of the display 1500 allows a user to change protocols that a controller expects for a device 325. In an embodiment, selecting a protocol tag 1505 on a predefined unit representation opens up a menu 1510 that shows the available protocols: in this case, RTD, Thermistor, 0-10V, and 2-10V. Selecting a protocol changes the protocol that the controller expects to receive from a device 325 represented by the predefined unit representation. Some protocols require that device wires have a different protocol, which the controller understands. Devices, such as a VOC sensor 1525 that are expected to be connected to the controller but are not yet assigned a location on the controller may be able to be displayed on panel 1555. Such a resource may be able to be moved into an open position e.g., 1535, at which it may look similar to a VOC predefined unit representation icon 1530.

Figure 16:
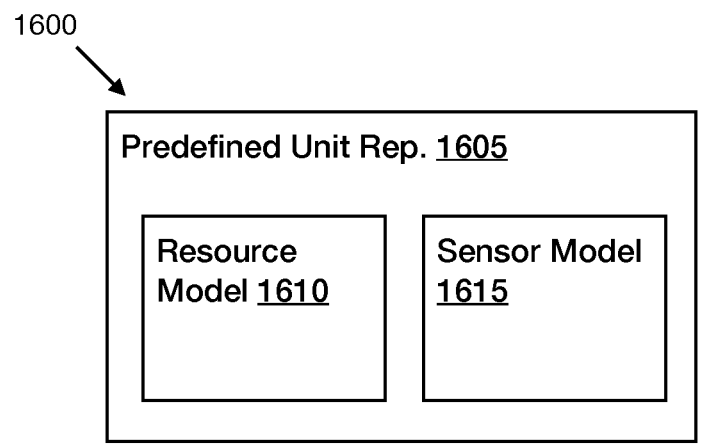
FIG. 16 depicts depicts some device model types in conjunction with which some described embodiments can be implemented.

FIG. 16 discloses a block diagram 1600 that describes different types of predefined unit model representations. A predefined unit model representation 1605 may be a resource model 1610 or a sensor model 1615. A sensor model is a model of a piece of equipment that detects a physical property, such as temperature, humidity, sound loudness, VOC, occupancy level, occupancy location, and so forth. A resource is something that is not a sensor. Some pieces of equipment that are normally thought of as resources, such as hot water heaters, may have attached sensors; in such edge cases, the attached sensor may be considered a sensor, and the hot water heater may be considered a resource. Other ways of dividing equipment between resources and sensors are also within the scope of this specification.

III. MODULE POSSIBILITIES AND TYPES

Figure 17:
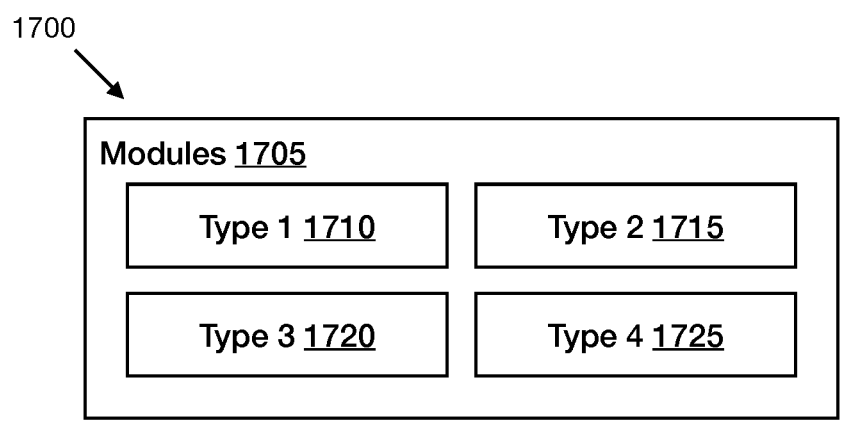
FIG. 17 discloses multiple module types in conjunction with which some described embodiments can be implemented.

FIG. 17 discloses a block diagram 1700 with multiple module types 1705. A controller may have one type, two types, . . . any number of types. When modules are used, some resources may require one or more specific modules, due to their wiring requirements. The defined space controller system 110 understands the nature of the modules and the nature of the specific wiring requirements of the devices through the predefined unit representation 235 stored in memory 220. In some cases, resources may have specific requirements defined by a user, e.g., through settings described in FIG. 11. The controller understands the module requirements as well as the device requirements, and so can match devices to appropriate modules.

A type of module may comprise the following options:

A module type 1 1710 may have 6× Universal Ports, which may be thermistors, RTD, 1-Wire, 0-10 V Input/Output, 0-20 mA Input/Output, 0-480 VAC Input, 24 VACC Output, and/or Modbus/RS485 Interface.

A module type 2 1715 may have 2× Power Control Blocks, which may be 120/240 VAC output—2 Amps, and/or 24 VAC output—2 Amps.

A module type 3 may have 2×DC motor control blocks, which may further have 12/24 VDC motor drivers, PWM speed control, Real-time current monitoring, Real time voltage monitoring, Overcurrent/torque protection, and/or tachometer feedback.

A module type 4 may have 2× Dry contact blocks. Such a module may also have SPDT relays (10 A), up to 240 VCD/VAC, real-time current monitoring, real-time voltage monitoring, and/or overcurrent protection.

Modules may also comprise some combination of the following:

A 0-10V DC analog voltage (via a DAC)
A Strong 1-wire pullup (via a FET)
A High-range voltage divider:
A Ground connection (through a FET)
A 24 VAC power connection (through a Triac)
A 0-10V DC analog voltage (via a DAC)
A Strong 1-wire pullup (via a FET)
A High-range voltage divider
A Low range voltage divider
A 4-20 mA current shunt
A 24 VAC current shunt
A DC offset injector that can measure both halves of an DC waveform
Real-time current monitoring and real-time voltage monitoring.

Modules may comprise features not otherwise mentioned. In some modules, when locations of predefined unit representations device wires or devices is changed in a physical structure representation 230, the controller modifies its controller connector 310 to fit the new requirements. In some embodiments, the module modifies its device connector 320 to fit the new requirements.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

We claim:

1. A controller comprising:
a processor, in communication with a memory storing a representation of a physical structure and a list of predefined unit models, the processor being configured to:
accept a predefined unit model representation from the list of predefined unit models;
accept placement of the predefined unit model representation into a location within the representation of the physical structure;
determine a location for a model of the controller within the representation of the physical structure based at least in part on the location of the predefined unit model representation within the representation of the physical structure;
create a wiring route between a controller representation of itself and a device represented by a predefined unit model associated with the predefined unit model representation; and
wherein the controller is operationally able to modify a controller terminal to match a terminal type required by the device.

2. The controller of claim 1, wherein a physical representation of at least a portion of the wiring route is shown on a display apparatus associated with the controller.

3. The controller of claim 2, further comprising allowing a user to use a display apparatus to select a value between high labor cost and high controller cost.

4. The controller of claim 3, further comprising using a fill rate to create the wiring route, wherein the fill rate describes percent of controller connectors that are optimally filled.

5. The controller of claim 3, wherein the controller is operationally able to create a wiring route between the model of itself and the predefined unit model, and wherein the selection of a value between high labor cost and high controller cost modifies the wiring route.

6. The controller of claim 1, wherein the controller is operationally able to create a wiring route between the model of itself and the predefined unit model.

7. The controller of claim 6, wherein distance from the controller to the device is taken into account.

8. The controller of claim 1, wherein the controller is operationally able to determine a controller terminal to attach to a device associated with the predefined unit model.

9. The method of claim 1, wherein the predefined unit model representation comprises a device, a quanta, a pin layout, or a protocol.

10. A method executed by a processor on a controller comprising:
accepting a representation of a physical structure;
accepting a predefined unit model representation from a list of predefined unit models displayed on a display apparatus;
accepting placement of the predefined unit model representation into a location within the representation of the physical structure;
the controller determining a location for itself within the representation of the physical structure based at least in part on the location of the predefined unit model representation within the representation of the physical structure; and
the controller creating a wiring route between a controller representation of the controller and a predefined unit model associated with the predefined unit model representation; and
wherein the controller is operationally able to modify the controller terminal to match the terminal type required by the device.

11. The method of claim 10, wherein the predefined unit model representation is represented as being wired to a module.

12. The method of claim 10, wherein the predefined unit model representation comprises a device, a quanta, a pin layout, or a protocol.

13. The method of claim 10, wherein the predefined unit model representation is able to be modified by a user.

14. The method of claim 10, wherein the wiring route comprises a pin layout display.

15. The method of claim 10, wherein the controller representation further comprises a module representation, and wherein the controller connects to a device represented by the predefined unit model through a module associated with the module representation.

16. The method of claim 15, wherein the module representation comprises multiple module types, and wherein a predefined unit module can only attach to certain module representation types.

17. The method of claim 10, further comprising the controller creating a wiring route between a model of itself and the predefined unit model.

18. The method of claim 17, wherein a terminal type is required by the predefined unit model, the controller determines a controller terminal representation that will attach to a device associated with the predefined unit model, and wherein the controller modifies a controller terminal associated with the controller terminal representation.

19. A non-transitory machine-readable storage medium configured with data and with instructions that upon execution by at least one processor in a controller will cause the at least one processor to perform a technical process for creating a user-guided wiring system, the non-transitory machine-readable storage medium comprising:
instructions for accepting a predefined unit model representation from a list of predefined unit models displayed on a display apparatus;
instructions for accepting placement of the predefined unit model representation into a location within a representation of a physical structure;
instructions for the controller to determine a location for a model of itself within the representation of the physical structure based at least in part on the location of the predefined unit model representation;
instructions for the controller to create a wiring route between a controller representation of the controller and the predefined unit model representation; and
instructions for the controller to modify the controller terminal to match the terminal type required by the device.

20. The non-transitory machine-readable storage medium of claim 19, further comprising instructions for the controller to create a wiring route between itself and the predefined unit model.

21. The non-transitory machine-readable storage medium of claim 19, wherein a terminal type is required by a device associated with the predefined unit model, further comprising instructions for the controller to determine a controller terminal to attach the device.

22. The method of claim 19, wherein the predefined unit model representation comprises a device, a quanta, a pin layout, or a protocol.

\* \* \* \* \*